(12) United States Patent
Sakai

(10) Patent No.: US 7,953,078 B2
(45) Date of Patent: May 31, 2011

(54) INFORMATION PROCESSING APPARATUS, CONTROL METHOD FOR INFORMATION PROCESSING APPARATUS, AND PROGRAM

(75) Inventor: Masahiko Sakai, Kawasaki (JP)

(73) Assignee: Canon Kabushiki Kaisha (JP)

( * ) Notice: Subject to any disclaimer, the term of this patent is extended or adjusted under 35 U.S.C. 154(b) by 538 days.

(21) Appl. No.: 11/689,053

(22) Filed: Mar. 21, 2007

(65) Prior Publication Data

US 2007/0223473 A1 Sep. 27, 2007

(30) Foreign Application Priority Data

Mar. 24, 2006 (JP) ................................. 2006-083868

(51) Int. Cl.
*H04L 12/56* (2006.01)
(52) U.S. Cl. ....... 370/389; 370/401; 370/397; 358/1.15; 358/448; 358/505
(58) Field of Classification Search .................. 370/397, 370/389; 358/1.15, 405; 707/10; 709/201
See application file for complete search history.

(56) References Cited

U.S. PATENT DOCUMENTS

| | | | | |
|---|---|---|---|---|
| 7,265,859 | B2 * | 9/2007 | Sato ............................. | 358/1.15 |
| 2001/0023254 | A1 * | 9/2001 | McElroy ....................... | 514/439 |
| 2001/0029521 | A1 * | 10/2001 | Matsuda et al. .............. | 709/201 |
| 2001/0050782 | A1 * | 12/2001 | Niitsuma et al. ............. | 358/1.15 |
| 2002/0075529 | A1 * | 6/2002 | Sato et al. ..................... | 358/505 |
| 2004/0208184 | A1 * | 10/2004 | Tanaka et al. ................. | 370/397 |
| 2005/0220100 | A1 * | 10/2005 | Kawabe ........................ | 370/389 |
| 2006/0023254 | A1 * | 2/2006 | Hikichi ......................... | 358/1.15 |
| 2007/0174293 | A1 * | 7/2007 | Kim et al. ..................... | 707/10 |

FOREIGN PATENT DOCUMENTS

| | | |
|---|---|---|
| JP | 2003-099230 A | 4/2003 |
| JP | 2004-129056 A | 4/2004 |

OTHER PUBLICATIONS

Office Action issued in corresponding Japanese Patent Application No. 2006-083868 dated Jun. 11, 2010.

* cited by examiner

*Primary Examiner* — Robert W Wilson
*Assistant Examiner* — Mohamed Kamara
(74) *Attorney, Agent, or Firm* — Rossi, Kimms & McDowell LLP

(57) ABSTRACT

The address of an image processing apparatus is set as the network address of an external network of an information processing apparatus, a network address different from the address of the image processing apparatus is set as the network address of a local network, and an address different from these network addresses is distributed to another information processing apparatus.

20 Claims, 17 Drawing Sheets

FIG. 15

| | |
|---|---|
| VERSION (2byte) | |
| Request CODE (2byte) | |
| Result CODE (2byte) | |
| MEDIA TYPE (2byte) | |
| PROTOCOL INFORMATION | NetWare Valid (1byte) |
| | TCP / IP Valid (1byte) |
| | AppleTalk Valid (1byte) |
| | RESERVED (14byte) |
| RESERVED | RESERVED (2byte) |
| NetWare INFORMATION | FRAME TYPE (2byte) |
| | RESERVED (2byte) |
| TCP / IP INFORMATION | FRAME TYPE (2byte) |
| | OPERATION MODE (2byte) |
| | IP ADDRESS (2byte) |
| | GATEWAY ADDRESS (4byte) |
| | SUBNET MASK (4byte) |
| | BROADCAST (4byte) |
| AppleTalk INFORMATION | FRAME TYPE (2byte) |
| MAC ADDRESS (8byte) | |

INFORMATION PROCESSING APPARATUS, CONTROL METHOD FOR INFORMATION PROCESSING APPARATUS, AND PROGRAM

BACKGROUND OF THE INVENTION

1. Field of the Invention

The present invention relates to an information processing apparatus and, more particularly, to an information processing apparatus in an image processing system that includes an information processing apparatus as an extended control apparatus which is appended to an image processing apparatus to extend its functions and flexibility. In this case, the image processing apparatus has, e.g., a printer function, image input function, document filing function, document transmission/reception function, image conversion function, and the like.

2. Description of the Related Art

In recent years, most of printers, scanners, FAX apparatuses, or image processing apparatuses which have multi-functions of these apparatuses comprise a network communication function. Some of these image processing apparatuses having the network communication function comprise a data transfer function of sending image data to a PC, server, or the like connected via a network.

In such a data transfer function, host protocols such as an SMTP protocol used to transfer e-mail messages, an HTTP protocol that can implement i-FAX and file uploading, an FTP protocol used to output files, and the like are used. "HTTP" is short for Hyper Text Transfer Protocol, and "FTP" is short for File Transfer Protocol.

On the other hand, as a means for extending functions of an image processing apparatus, a so-called external controller apparatus is available. Such an external controller apparatus achieves various extended functions. For example, the external controller apparatus can extend a network function to convert data of a network (LAN) communication format used in a user environment into data suited to an I/F scheme of the image processing apparatus. Also, the external controller apparatus provides an extended storage function that spools communication data, and a load distribution function that takes over some processes to be executed by the image processing apparatus or a client apparatus.

As a connection mode between such an external controller apparatus and image processing apparatus, the network communication function of the image processing apparatus may be used upon connection. As the connection mode in this case, a dual-network mode in which the external controller apparatus is inserted between the image processing apparatus and a LAN, and works as a bridge between the image processing apparatus and LAN is known. Also, a single-network mode in which the image processing apparatus and the external controller apparatus are connected to the LAN is known.

Upon comparison between the single-network mode and dual-network mode, the dual-network mode does not consume the bandwidth of the LAN since an independent local network is formed between the external controller apparatus and image processing apparatus in this mode. The external controller apparatus and image processing apparatus exchange a large volume of image data. In the dual-network mode, the independent local network can use a transmission scheme of a broader bandwidth than the LAN in such case.

Furthermore, in the dual-network mode, the external controller apparatus and image processing apparatus behave as one network apparatus. On the other hand, in the single-network mode, the external controller apparatus and image processing apparatus independently consume logical resources such as network addresses and the like and physical resources such as a hub, ports, and the like. Therefore, the dual-network mode consumes fewer network resources in the LAN than the single-network mode.

Japanese Patent Laid-Open No. 2003-99230 discloses a method of providing additional functional capability by an information processing apparatus (to be referred to as an extended control apparatus hereinafter) connected to an image processing apparatus.

FIG. 16 is a diagram showing an example of a network environment using a conventional extended image processing system.

An extended image processing system 10 is configured by an image processing apparatus 100 and extended control apparatus 101. This system provides further extended functions to the image processing apparatus 100 which has a printer function, image input function, document filing function, document transmission/reception function, image conversion function, and the like. A network interface card (to be abbreviated as NIC hereinafter: not shown) of the image processing apparatus 100 and a NIC 20 of the extended control apparatus 101 are connected via a LAN 402. Note that the NIC 20 is also called a local NIC, and the LAN 402 is also called a local network. A NIC 21 of the extended control apparatus 101 is connected to an external LAN 400, and communicates with other network nodes via the external LAN 400. Note that the NIC 21 is also called an external NIC, and the external LAN 400 is also called an external network.

A client personal computer (to be referred to as a client PC hereinafter) 11 is a personal information processing apparatus, and is mainly set on the desktop of the user to execute various application programs. The client PC 11 is connected to the external LAN 400, and uses services provided by other network nodes or provides services to other network nodes via the external LAN 400.

A server computer 12 is a large-scale information processing apparatus, is connected to the external LAN 400, and provides services mainly to other network nodes via the external LAN 400. A printer 13 is a network-compatible peripheral device, is connected to the external LAN 400, and provides services of the image processing apparatus to other network nodes via the external LAN 400. A router 14 is a network node which connects neighboring networks, and connects a wide area network (WAN) 15 such as the Internet, virtual private network, and the like and the external LAN 400.

A case will be explained below using FIG. 16 wherein the extended control apparatus 101 that can provide a secure print application function is connected to the image processing apparatus 100 which has no secure print application function.

In the network environment, a print job which is generated at one site in the network can be printed at another site. In some cases, confidential information or information associated with secrecy in another aspect must be printed.

Upon transmitting such confidential information to a device, a method of transmitting a print job encrypted on the client PC 11 side to the device, and printing the print job decrypted on the device side is known. Also, a method of temporarily storing print information sent from the client PC 11 by the device, and printing that information when the user has been successfully authenticated using an IC card or the like on the device side is also known. In order to assure security protection against electronic eavesdropping of transmission, a print job may be generally encrypted by an encryption method using a secret key. Also, in order to permit to view hardcopy printouts without authentication or to electronically eavesdrop and view print jobs stored in a print queue, authentication using an IC card may be used.

However, when the image processing apparatus 100 is the conventional one which does not incorporate any decryption module corresponding to the encryption method for each client PC 11 or does not incorporate any decryption module or user authentication system, a secure print function cannot be used.

The extended control apparatus 101 is used as a means for extending the functions of the image processing apparatus 100. The extended control apparatus 101 incorporates a decryption module corresponding to the encryption method for each client PC 11, and provides the decryption module and user authentication system to the conventional image processing apparatus, thus allowing the image processing apparatus 100 to use the secure print function. A secure print application of the extended control apparatus 101 receives encrypted print data from the client PC 11 using an LPD protocol, and stores the received data in a storage device in the extended control apparatus 101. When the user has been authenticated using an IC card or the like, the secure print application transmits the stored print data to the image processing apparatus 100, thereby printing that data.

Note that the extended control apparatus 101 is transparent to the client PC 11, and the image processing apparatus 100 seems as if it were processing the secure print function.

FIG. 17 is a diagram showing another example of the network environment that uses the conventional extended image processing system. The system shown in FIG. 17 is the same as that shown in FIG. 16, except for functions of an extended control apparatus 102.

A case will be described below using FIG. 17 wherein the extended control apparatus 102 which can provide an e-mail print application function is connected to the image processing apparatus 100 which does not have any e-mail print application function.

In the network environment, a print job which is generated at one site in the network can be printed at another site. In some cases, the image processing apparatus 100 is connected to the external network via a firewall having a function of blocking external invasions and attacks and so forth, and access to the image processing apparatus 100 except for e-mail is inhibited. However, even when access other than e-mail is inhibited, printing must be done depending on circumstances.

Upon transmitting a print job to the image processing apparatus 100 connected via the firewall, the following methods are known. That is, the client PC 11 side attaches the print job to an e-mail message, and transmits that e-mail message to the image processing apparatus 100. Then, the image processing apparatus 100 side prints the print job attached to the received e-mail message, or picks up the e-mail message including print information sent from the client PC 11 from a POP server, and prints the print information.

However, when the image processing apparatus 100 is the conventional one which does not incorporate any SMTP server function or POP client function, an e-mail print function cannot be used.

However, the extended control apparatus 102 is used as a means for extending the functions of the image processing apparatus 100. Since the extended control apparatus 102 incorporates the SMTP server function and provides the POP client function to the conventional image processing apparatus, the image processing apparatus 100 can use the e-mail print function. The e-mail print application of the extended control apparatus 102 receives an e-mail message including print information transmitted from the client PC 11, and transmits the print information to the image processing apparatus 100, thus printing the print information.

Note that the extended control apparatus 102 is transparent to the client PC 11, and the image processing apparatus 100 seems as if it were processing the e-mail print function.

According to the method disclosed in Japanese Patent Laid-Open No. 2003-99230, the IP address of the external NIC of the extended control apparatus uses that of the image processing apparatus, and that of the local NIC is assigned an IP address, which is registered in advance.

The destination address of print data from the client PC is that of the external NIC of the extended control apparatus. A communication is made so that the destination address of the print data from the extended control apparatus to the image processing apparatus is that of the NIC of the image processing apparatus, and the source address is that of the local NIC of the extended control apparatus.

However, the technique disclosed in Japanese Patent Laid-Open No. 2003-99230 poses the following problem upon daisy-chain connecting a plurality of extended control apparatuses between the LAN and image processing apparatus. That is, since the technique disclosed in Japanese Patent Laid-Open No. 2003-99230 does not take a combination of functions provided by the respective extended control apparatuses into consideration, the same IP address may be assigned to the local NICs of the respective extended control apparatuses. For this reason, this poses a problem for communications between application modules on the respective extended control apparatuses and those on the image processing apparatus.

Such a problem is not specific to the image processing apparatus and extended control apparatus, but is common in daisy-chains connecting the image processing apparatus and a plurality of information processing apparatuses via a local network.

SUMMARY OF THE INVENTION

The present invention provides a technique that can prevent the same address from being assigned to local NICs of respective information processing apparatuses even when a plurality of information processing apparatuses are daisy-chain connected between an external LAN and image processing apparatus.

An information processing apparatus according to one aspect of the present invention is an information processing apparatus which can communicate with an image processing apparatus, the information processing apparatus comprising: a first network interface adapted to connect the image processing apparatus via a network; a second network interface adapted to connect other information processing apparatus via a network; a first setting unit adapted to set a network address of the image processing apparatus as a network address of the second network interface; a second setting unit adapted to set a network address different from the network address set by the first setting unit as a network address of the first network interface; a determining unit adapted to determine a network address different from the network address set by the first setting unit and the network address set by the second setting unit as a network address of the other information processing apparatus based on the network address set by the first setting unit and the network address set by the second setting unit; and a transmitting unit adapted to transmit the network address determined by the determining unit to the other information processing apparatus.

An information processing apparatus according to another aspect of the present invention is an information processing apparatus which can communicate with an image processing apparatus, the information processing apparatus comprising:

a network interface adapted to connect the image processing apparatus and other information processing apparatus via a network; a first setting unit adapted to set a network address of the image processing apparatus as a network address of the network interface; a second setting unit adapted to set a network address different from the network address set by the first setting unit as a network address of the network interface; a first determining unit adapted to determine a network address different from the network address set by the first setting unit and the network address set by the second setting unit as a network address of the other information processing apparatus based on the network address set by the first setting unit and the network address set by the second setting unit; and a transmitting unit adapted to transmit the network address determined by the first determining unit to the other information processing apparatus.

An information processing apparatus according to still another aspect of the present invention is an information processing apparatus which can communicate with an image processing apparatus, the information processing apparatus comprising: a first network interface adapted to connect other information processing apparatus, which is connected to the image processing apparatus via a first network, via a second network different from the first network; a second network interface adapted to connect a third network different from the first network and the second network; a first setting unit adapted to set a network address of the image processing apparatus as a network address of the second network interface; a receiving unit adapted to receive a network address different from a network address set in the other information processing apparatus from the other information processing apparatus; and a second setting unit adapted to set the network address received by the receiving unit as a network address of the first network interface.

An information processing apparatus according to still another aspect of the present invention is an information processing apparatus which can communicate with an image processing apparatus, the information processing apparatus comprising: a first network interface adapted to connect other information processing apparatus, which is connected to the image processing apparatus via a first network, via a second network different from the first network; a second network interface adapted to connect a third network different from the first network and the second network; a first setting unit adapted to set a network address of the image processing apparatus as a network address of the second network interface; a receiving unit adapted to receive a network address different from a network address set in the other information processing apparatus from the other information processing apparatus; and a second setting unit adapted to set a network address different from the network address received by the receiving unit as a network address of the first network interface.

A method of controlling an information processing apparatus according to still another aspect of the present invention is a method of controlling an information processing apparatus which can communicate with an image processing apparatus, the method comprising: a first setting step of setting a network address of the image processing apparatus as a network address of a second network interface out of a first network interface adapted to connect the image processing apparatus via a network, and the second network interface adapted to connect other information processing apparatus via a network; a second setting step of setting a network address different from the network address set in the first setting step as a network address of the first network interface; a first determining step of determining a network address different from the network address set in the first setting step and the network address set in the second setting step as a network address of the other information processing apparatus based on the network address set in the first setting step and the network address set in the second setting step; and a transmitting step of transmitting the network address determined in the first determining step to the other information processing apparatus.

A method of controlling an information processing apparatus according to still another aspect of the present invention is a method of controlling an information processing apparatus which can communicate with an image processing apparatus, the method comprising: a first setting step of setting a network address of the image processing apparatus as a network address of a second network interface out of a first network interface adapted to connect other information processing apparatus, which is connected to the image processing apparatus via a first network, via a second network different from the first network, and the second network interface adapted to connect a third network different from the first network and the second network; a receiving step of receiving a network address different from a network address set in the other information processing apparatus from the other information processing apparatus; and a second setting step of setting the network address received in the receiving step as a network address of the first network interface.

A method of controlling an information processing apparatus according to still another aspect of the present invention is a method of controlling an information processing apparatus which can communicate with an image processing apparatus, the method comprising: a first setting step of setting a network address of the image processing apparatus as a network address of a second network interface out of a first network interface adapted to connect other information processing apparatus, which is connected to the image processing apparatus via a first network, via a second network different from the first network, and the second network interface adapted to connect a third network different from the first network and the second network; a receiving step of receiving a network address different from a network address set in the other information processing apparatus from the other information processing apparatus; and a second setting step of setting a network address different from the network address received in the receiving step as a network address of the first network interface.

A program according to still another aspect of the present invention is a computer-executable program which implements a method of controlling an information processing apparatus which can communicate with an image processing apparatus, the program being comprising: a first setting step of setting a network address of the image processing apparatus as a network address of a second network interface out of a first network interface adapted to connect the image processing apparatus via a network, and the second network interface adapted to connect other information processing apparatus via a network; a second setting step of setting a network address different from the network address set in the first setting step as a network address of the first network interface; a first determining step of determining a network address different from the network address set in the first setting step and the network address set in the second setting step as a network address of the other information processing apparatus based on the network address set in the first setting step and the network address set in the second setting step; and a transmitting step of transmitting the network address determined in the first determining step to the other information processing apparatus.

A program according to still another aspect of the present invention is a computer-executable program which implements a method of controlling an information processing apparatus which can communicate with an image processing apparatus, the program being comprising: a first setting step of setting a network address of the image processing apparatus as a network address of a second network interface out of a first network interface adapted to connect other information processing apparatus, which is connected to the image processing apparatus via a first network, via a second network different from the first network, and the second network interface adapted to connect a third network different from the first network and the second network; a receiving step of receiving a network address different from a network address set in the other information processing apparatus from the other information processing apparatus; and a second setting step of setting the network address received in the receiving step as a network address of the first network interface.

A program according to still another aspect of the present invention is a computer-executable program which implements a method of controlling an information processing apparatus which can communicate with an image processing apparatus, the program being comprising: a first setting step of setting a network address of the image processing apparatus as a network address of a second network interface out of a first network interface adapted to connect other information processing apparatus, which is connected to the image processing apparatus via a first network, via a second network different from the first network, and the second network interface adapted to connect a third network different from the first network and the second network; a receiving step of receiving a network address different from a network address set in the other information processing apparatus from the other information processing apparatus; and a second setting step of setting a network address different from the network address received in the receiving step as a network address of the first network interface.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is a schematic view showing the structure of a data part of the packet in the configurator protocol.

DESCRIPTION OF THE EMBODIMENTS

Embodiments of the present invention will be described in detail hereinafter. Note that an embodiment of the present invention will exemplify extension of the functions of an image processing apparatus. However, the present invention is not limited to the image processing apparatus, but it can be applied to similar extension methods, and also includes such applications. In the embodiment of the present invention, two functions, i.e., a secure print function and e-mail print function, will be explained as extended functions of the extended control apparatus. However, the present invention is not characterized by the extended functions themselves, but it is characterized by the configurations and operations upon connecting a plurality of extended control apparatuses. Hence, the extended functions are not particularly limited.

<Configuration Example of Network Including Extended Image Processing System of The Present Embodiment>

Figure 1:
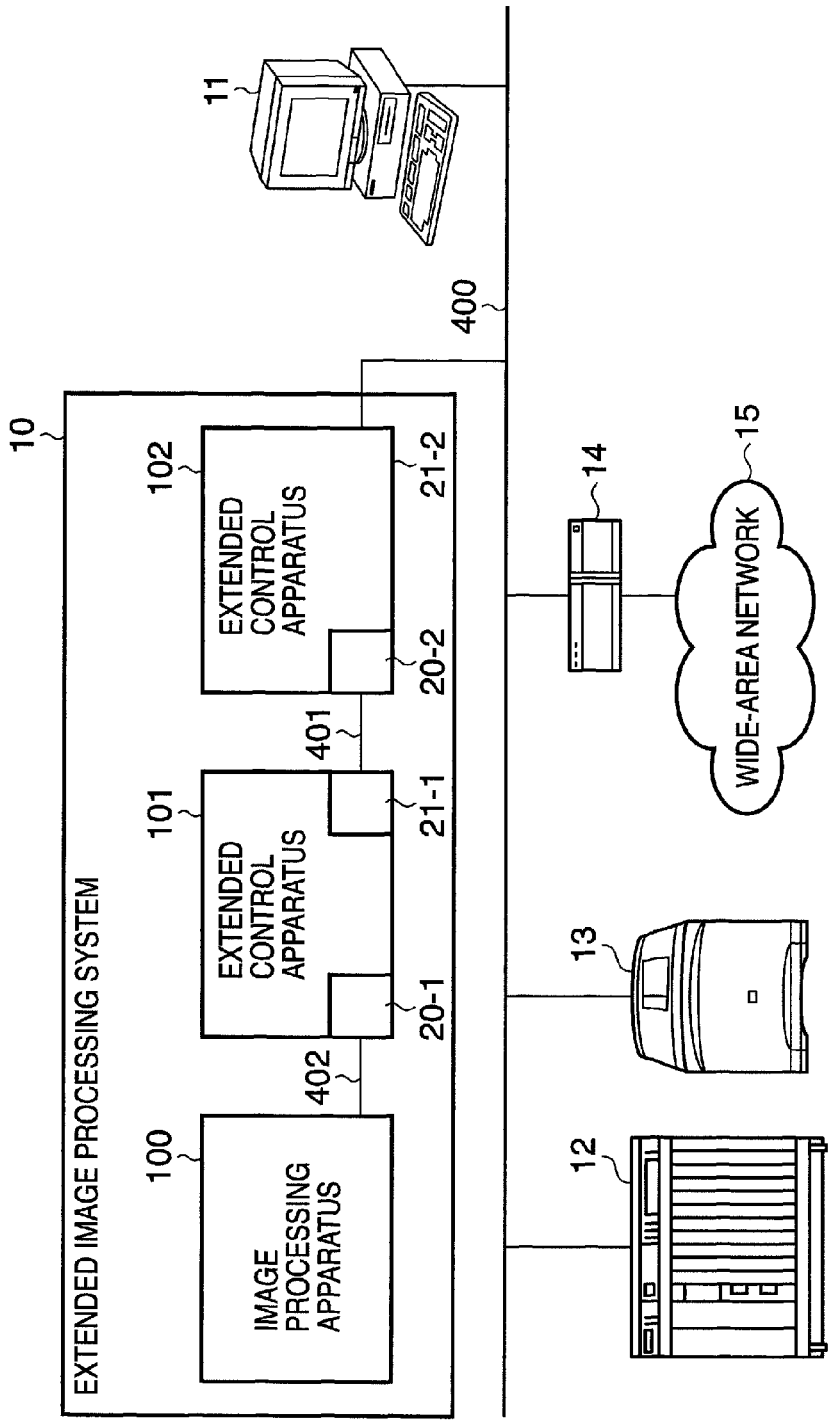
FIG. 1 is a diagram showing an example of a network environment that uses an extended image processing system according to the present embodiment.

FIG. 1 is a diagram showing an example of a network environment that uses an extended image processing system according to the present embodiment.

An extended image processing system 10 is configured by an image processing apparatus 100, extended control apparatus 101, and extended control apparatus 102. In the extended image processing system 10, the extended control apparatuses 101 and 102 further provide two extended functions to the image processing apparatus 100 which has a printer function, image input function, document filing function, document transmission/reception function, image conversion function, and the like.

As shown in FIG. 1, the image processing apparatus 100 as an apparatus whose functions are to be extended, and the extended control apparatuses 101 and 102 are daisy-chain connected via internal LANs 401 and 402. More specifically, a NIC (not shown) of the image processing apparatus is connected to a local NIC 20-1 of the extended control apparatus 101 via the internal LAN 402. Also, an external NIC 21-1 of the extended control apparatus 101 is connected to a local NIC 20-2 of the extended control apparatus 102 via the internal LAN 401. Furthermore, an external NIC 21-2 of the extended control apparatus 102 is connected to an external LAN 400, and the extended image processing system 10 communicates with other network nodes via the external LAN 400.

A client PC 11 is a personal information processing apparatus, and is mainly set on the desktop of the user to execute various application programs. The client PC 11 is connected to the external LAN 400, and uses services provided by other network nodes or provides services to other network nodes via the external LAN 400.

A server computer 12 is a large-scale information processing apparatus, is connected to the external LAN 400, and provides services mainly to other network nodes via the external LAN 400.

A printer 13 is a network-compatible peripheral device, is connected to the external LAN 400, and provides services of the image processing apparatus to other network nodes via the external LAN 400.

A router 14 is a network node which connects neighboring networks, and connects a wide area network (WAN) 15 such as the Internet, virtual private network, and the like and the external LAN 400.

The external LAN 400 is a local network laid down in a user's office or the like.

<Arrangement Example of Extended Image Processing System of The Present Embodiment>

Figure 2:
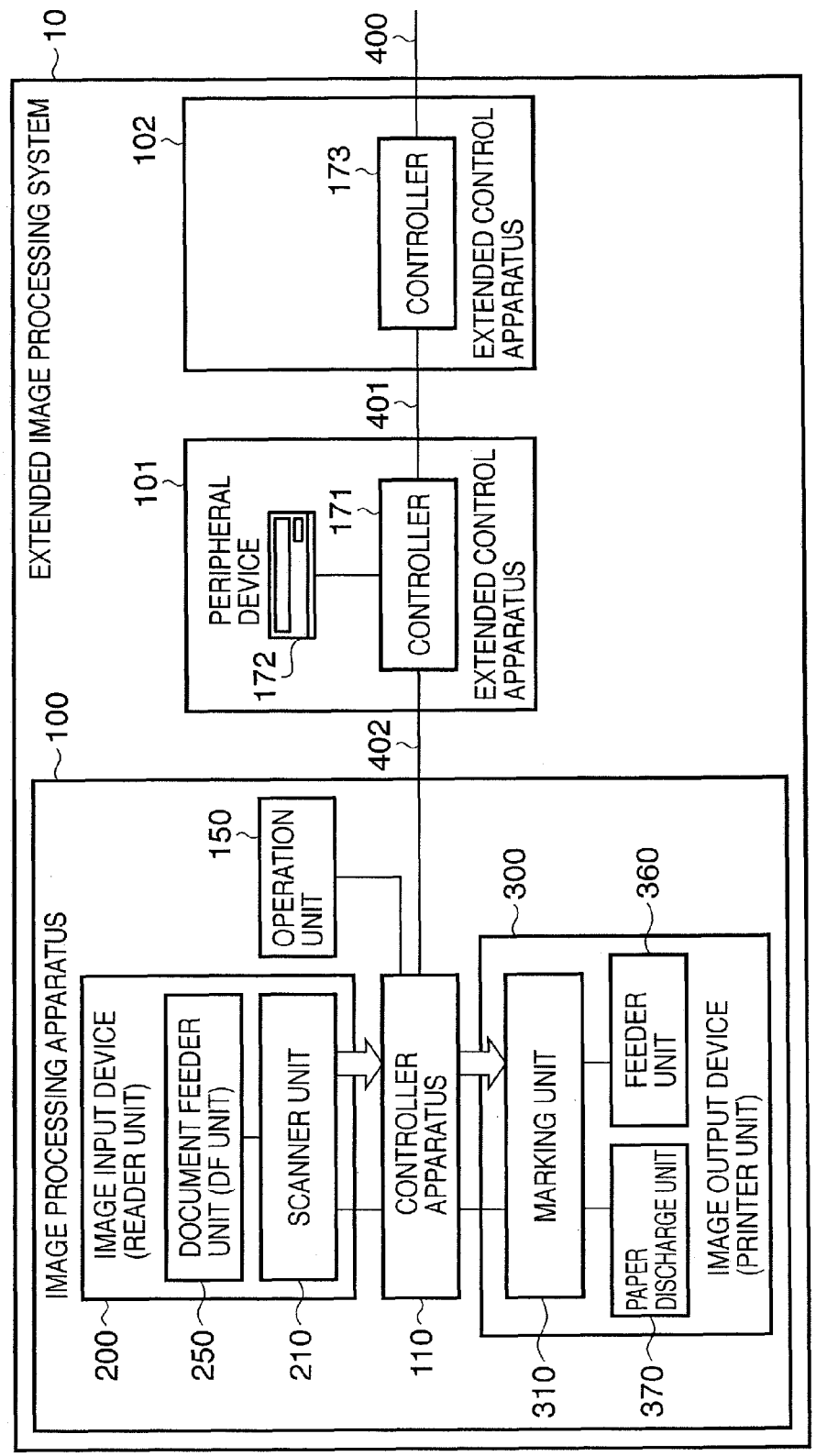
FIG. 2 is a block diagram of the extended image processing system as the combination of an image processing apparatus and extended control apparatuses according to the present embodiment.

FIG. 2 is a block diagram of the extended image processing system as a combination of the image processing apparatus 100 and extended control apparatuses 101 and 102 according to the present embodiment.

(Schematic Arrangement Example of Image Processing Apparatus 100)

The image processing apparatus 100 provides various basic image processing functions such as a printer function, image input function, document filing function, document transmission/reception function, image conversion function, and the like.

A reader unit (image input device) 200 optically reads a document image and converts it into image data. The reader unit 200 includes a scanner unit 210 which has a function of reading a document, and a document feed unit 250 which has a function of feeding document sheets.

A printer unit (image output device) 300 conveys a print sheet, prints image data on the print sheet as a visible image, and discharges the print sheet outside the apparatus. The printer unit 300 includes a marking unit 310, feeder unit 360, and paper paper discharge unit 370. The marking unit 310 has a function of transferring and fixing image data on a print sheet. The feeder unit 360 has a plurality of different types of paper cassettes. The paper discharge unit 370 has a function of sorting and stapling printed print sheets, and discharging the stapled printed sheets outside the apparatus.

A controller apparatus 110 is electrically connected to the reader unit 200 and printer unit 300, and is also connected to the external LAN 400. The controller apparatus 110 provides a copy function by controlling the reader 200 to read image data of a document, and controlling the printer unit 300 to output the image data onto a print sheet. Also, the controller apparatus 110 provides a scanner function by converting image data read by the reader unit 200 into code data, and transmitting the code data to a client apparatus (not shown) via the external LAN 400. Furthermore, the controller apparatus 110 provides a printer function by converting code data received from a client apparatus via the external LAN 400 into image data, and outputting the converted image data to the printer unit 300.

An operation unit 150 is connected to the controller apparatus 110, and comprises a liquid crystal touch panel. The operation unit 150 provides a user I/F required to operate an image input/output system.

(Schematic Arrangement Example of Extended Control Apparatuses 101 and 102)

The extended control apparatus 101 includes a controller 171 and peripheral device 172. The controller 171 can execute software programs including an operating system, various device drivers, and various application programs. The peripheral device 172 includes various types of peripheral devices, which extend the hardware of the extended control apparatus 101.

The extended control apparatus 102 includes a controller 173. The controller 173 execute software programs including an operating system, various device drivers, and various application programs.

The image processing apparatus 100 and extended control apparatus 101 are connected via the internal LAN 402 and can communicate with each other. The extended control apparatus 102 is connected to the extended control apparatus 101 via the internal LAN 401, and can communicate with the image processing apparatus 100 in two ways.

<Arrangement Example of Image Processing Apparatus 100 of The Present Embodiment>

(Hardware Arrangement Example of Image Processing Apparatus 100)

Figure 3:
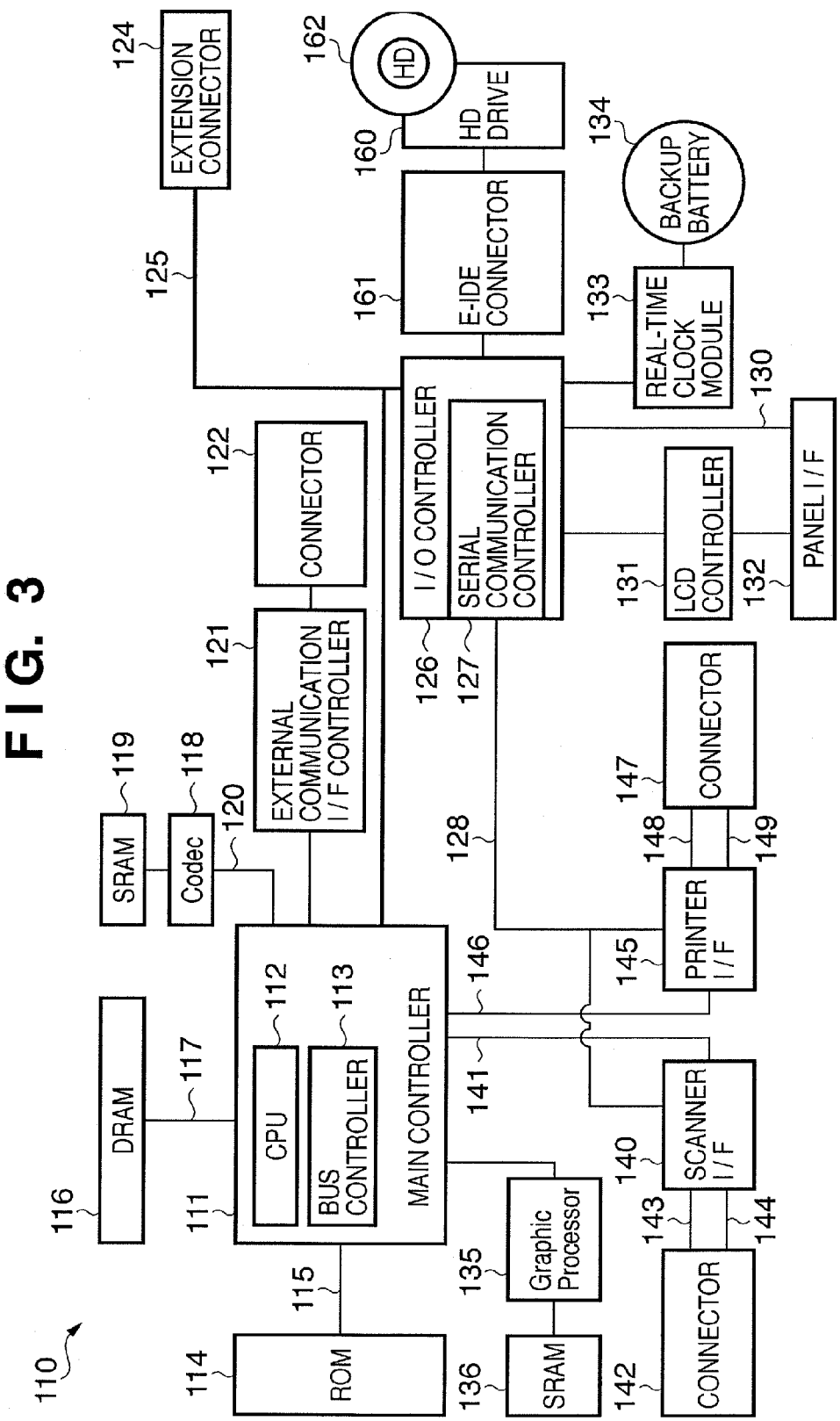
FIG. 3 is a block diagram showing the hardware arrangement of a controller apparatus of the image processing apparatus according to the present embodiment.

FIG. 3 is a block diagram showing an example of the hardware arrangement of the controller apparatus 110 of the image processing apparatus 100.

A main controller 111 mainly comprises a CPU 112, bus controller 113, and various I/F controller circuits.

The CPU 112 and bus controller 113 control the operations of the overall controller apparatus 110. The CPU 12 operates based on a program which is loaded from a ROM 114 via a ROM I/F 115. Such a program describes an operation for interpreting PDL (page description language) code data received from a client apparatus and rasterizing it to raster image data, and that operation is processed by software. The bus controller 113 controls data transfer input/output from respective I/Fs, and controls arbitration upon bus contention and DMA data transfer.

A DRAM 116 is connected to the main controller 111 via a DRAM_I/F 117, and is used as a work area to operate the CPU 112, and an area used to store image data.

A codec 118 compresses raster image data stored in the DRAM 116 by a method such as MH, MR, MMR, JBIG, JPEG, or the like, and decompresses the compressed stored code data to raster image data. An SRAM 119 is used as a temporal work area of the codec 118. The codec 118 is connected to the main controller 111 via an I/F 120. The bus controller 113 controls data transfer between the codec 118 and DRAM 16 to attain DMA transfer.

A graphic processor 135 executes processing such as image rotation, variable magnification processing, color space conversion, and the like. An SRAM 136 is used as a temporary work area for the graphic processor 135.

An external communication I/F controller 121 is connected to the main controller 111 via a connector 122, and is connected to an external network via the connector 122.

To a general high-speed bus 125, an extension connector 124 used to connect an extension board and an I/O controller 126 are connected. The general high-speed bus 125 normally adopts a PCI bus.

The I/O controller 126 is equipped with an asynchronous serial communication controller 127 of two channels, which is used to exchange control commands with the CPUs of the reader unit 200 and printer unit 300. The asynchronous serial communication controller 127 is connected to a scanner I/F 140 and printer I/F 145 as external I/F circuits.

A panel I/F 132 is connected to an LCD controller 131, and includes an I/F required to make display on a liquid crystal screen of the operation unit 150, and a key input I/F 130 used to attain inputs of hardware keys and touch panel keys.

The operation unit 150 has a liquid crystal display unit, a touch panel input device adhered onto the liquid crystal display unit, and a plurality of hardware keys. A signal input by some touch panel key or hardware key is sent to the CPU 112 via the aforementioned panel I/F 132, and the liquid crystal display unit displays image data sent from the panel I/F 132. The liquid crystal display unit displays functions upon operation of the image processing apparatus 100, image data, and the like.

A real-time clock module 133 updates/saves the date and time managed inside the device, and is backed up by a backup battery 134.

An E-IDE connector 161 is used to connect an external storage device. In the present embodiment, a hard disk drive (HD drive) 160 is connected to the E-IDE connector 161, so that image data is stored in a hard disk (HD) 162 or is read out from the hard disk 162.

A connector 142 is connected to the reader unit 200, and includes an asynchronous serial I/F 143 and video I/F 144. A connector 147 is connected to the printer unit 300, and includes an asynchronous serial I/F 148 and video I/F 149.

The scanner I/F 140 is connected to the reader unit 200 via the connector 142, and is connected to the main controller 111 via a scanner bus 141. The scanner I/F 140 has a function of applying predetermined processing to an image received from the reader unit 200. Furthermore, the scanner I/F 140 has a function of outputting a control signal generated based on a video control signal sent from the reader unit 200 onto the scanner bus 141.

The bus controller 113 controls data transfer from the scanner bus 141 to the DRAM 116.

The printer I/F 145 is connected to the printer unit 300 via a connector 147, and is connected to the main controller 111 via a printer bus 146. The printer I/F 145 has a function of applying predetermined processing to image data output from the main controller 111, and outputting the processed data to the printer unit 300. Also, the printer I/F 145 has a function of outputting a control signal generated based on a video control signal sent from the printer unit 300 onto the printer bus 146.

The bus controller 113 controls transfer of raster image data rasterized on the DRAM 116 to the printer unit 300. In other words, the raster image data rasterized on the DRAM 116 is DMA-transferred to the printer unit 300 via the printer bus 146 and the video I/F 149.

(Software Configuration Example of Image Processing Apparatus 100)

Figure 4:
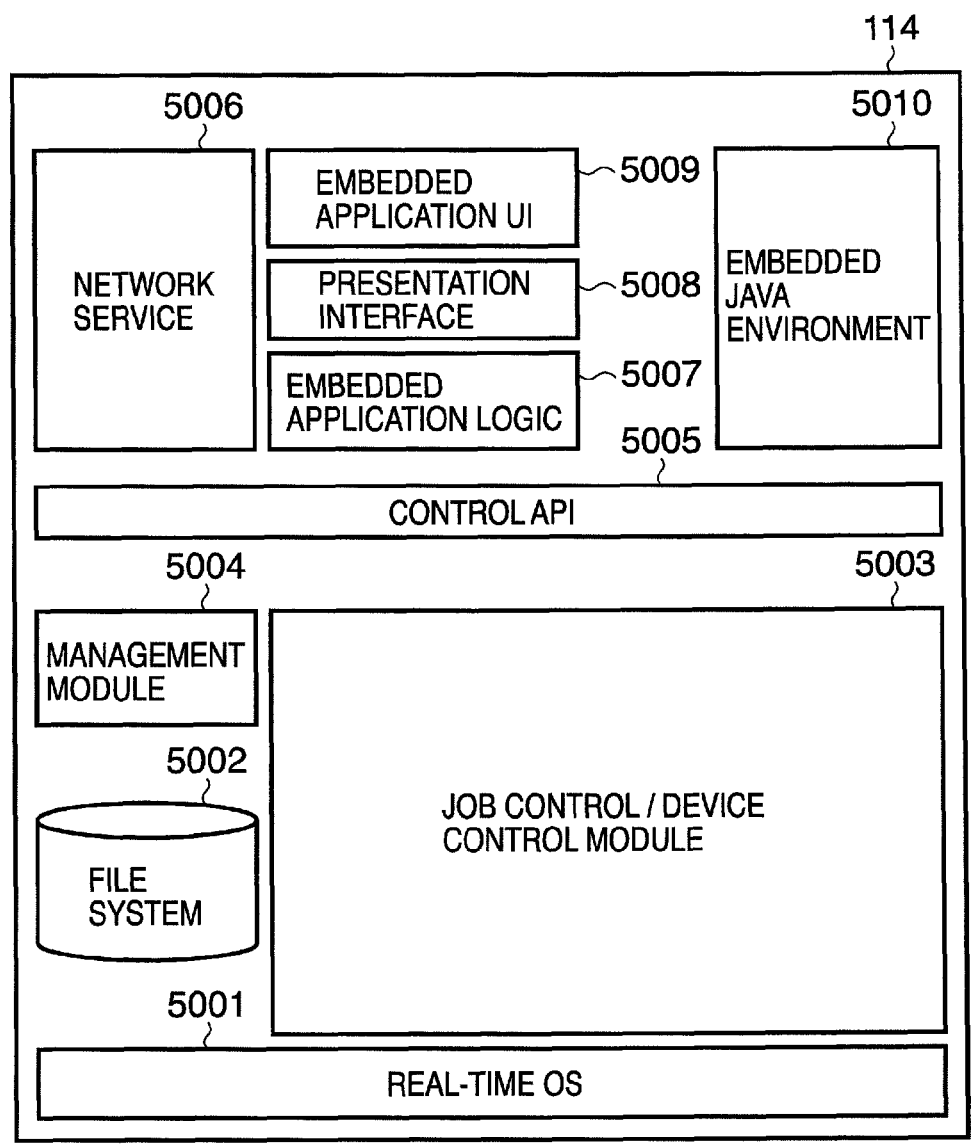
FIG. 4 is a block diagram showing the software module configuration of the controller apparatus of the image processing apparatus according to the present embodiment.

FIG. 4 is a block diagram showing an example of the software module configuration of the controller apparatus 110 of the image processing apparatus 100. Such software modules are stored in the ROM 114. Note that these software modules may be stored in the RAM or may be loaded from a disk onto the RAM.

Software processed by the controller apparatus 110 incorporated in the image processing apparatus 100 is implemented as so-called firmware, which is executed by the CPU 112.

A real-time OS 5001 is a real-time operating system, and provides various resource management services and frameworks optimized to control an embedded system for software programs that run on the OS. Various resource management services and frameworks provided by the real-time OS 5001 include: for example, multitask management (thread management) that makes a plurality of processes operate substantially in parallel by managing a plurality of executable contexts of processes by the CPU; a protocol stack which implements processes of various protocols such as inter-task communications that implement synchronization and data exchange between tasks, memory management, interrupt management, various device drivers, local interfaces, networks, communications, and the like; and so forth.

A file system 5002 is a mechanism which is 25 built up on storage devices such as a hard disk, memories, and the like, and is required to store data. The file system 5002 is used to spool jobs to be handled by the controller apparatus 110 of the image processing apparatus 100 and to save various data.

A job control/device control module 5003 controls the hardware of the image processing apparatus 100, and also controls jobs which use basic functions (print, scan, communication, image conversion, and the like) mainly provided by the hardware of the image processing apparatus 100.

A management module 5004 controls the internal state associated with the operation of the controller apparatus 110 of the image processing apparatus 100. In other words, the management module 5004 manages the operation of the controller apparatus 110.

A control API 5005 is an application programming interface which is provided so as to allow an embedded application group higher than this layer to use services provided by a software module group lower than this layer.

A network service 5006 allows an external network node such as the client PC or the like to use the basic functions of the apparatus through mutual conversion of the control API 5005 and network protocol. In particular, the network service 5006 comprises a network server function which implements various protocols (LPR, NetWare, SMB, PAP, IPP, and the like) for the network print function. With this function, the network service 5006 allows the external network node such as the client PC or the like to input print jobs.

The network service 5006 provides secure network connections implemented by an encryption technique and the like. The network service 5006 also provides a mechanism for easily tunneling non-secure TCP connections using Secure Shell (secsh or SSH) of IETF.

An embedded application logic 5007, presentation interface 5008, and embedded application UI 5009 configure an embedded application. The embedded application implements higher-level functions such as copy, image scan, document transmission/reception, document filing, and the like in addition to the basic functions of the image processing apparatus 100 using the basic functions of the control API 5005.

The embedded application logic 5007 corresponds to a business logic of the embedded application.

The presentation interface 5008 is an interface provided to separate the business logic and presentation logic of the embedded application.

The embedded application UI 5009 corresponds to the presentation logic of the embedded application. The embedded application UI 5009 controls display and inputs on a graphical user interface (GUI) that allows the user to manipulate the embedded application. The embedded application UI 5009 provides a local user interface on the operation unit 150 of the image processing apparatus 100. Furthermore, the embedded application UI 5009 also provides a Web application implemented using a markup language such as HTML or the like and Web techniques such as HTTP and the like.

The user can remote control the image processing apparatus 100 by connecting the Web application from a Web browser which runs on the client PC 11 or the like. In the present embodiment, a presentation layer of the embedded application implemented as the Web application will be referred to as a remote UI.

An embedded Java™ environment 5010 is an interpreter environment configured with a focus on a Java™ virtual machine. The embedded Java™ environment 5010 loads and combines instruction string data described using Java™ byte codes, and the Java™ virtual machine sequentially loads and interprets instructions and executes them. With this environment, on the entire firmware which is statically combined to a single load module as well as the real-time OS 5001, the extensibility and flexibility that allows for dynamic addition or replacement of software even very partially can be assured.

A Java™ Native Interface (JNI) provides firmware (native system) resources including the real-time OS 5001, job control/device control module 5003, control API 5005, and the like. Furthermore, the JNI provides a Java™ class library group which allows a Java™ program to use services. The basic part of embedded Java™ environment 5010 is built up with well-known Java™ 2 Platform, Micro Edition.

The embedded application logic 5007 in the image processing apparatus 100 can be controlled from the presentation logic implemented by an application in the system of the extended control apparatus 101.

The image processing apparatus 100 stores a flag used to control whether or not it cooperates with the extended control apparatus 101, and this flag is stored in a nonvolatile memory or the like (not shown).

(Display Example of Liquid Crystal Display Unit of Image Processing Apparatus 100)

Figure 5:
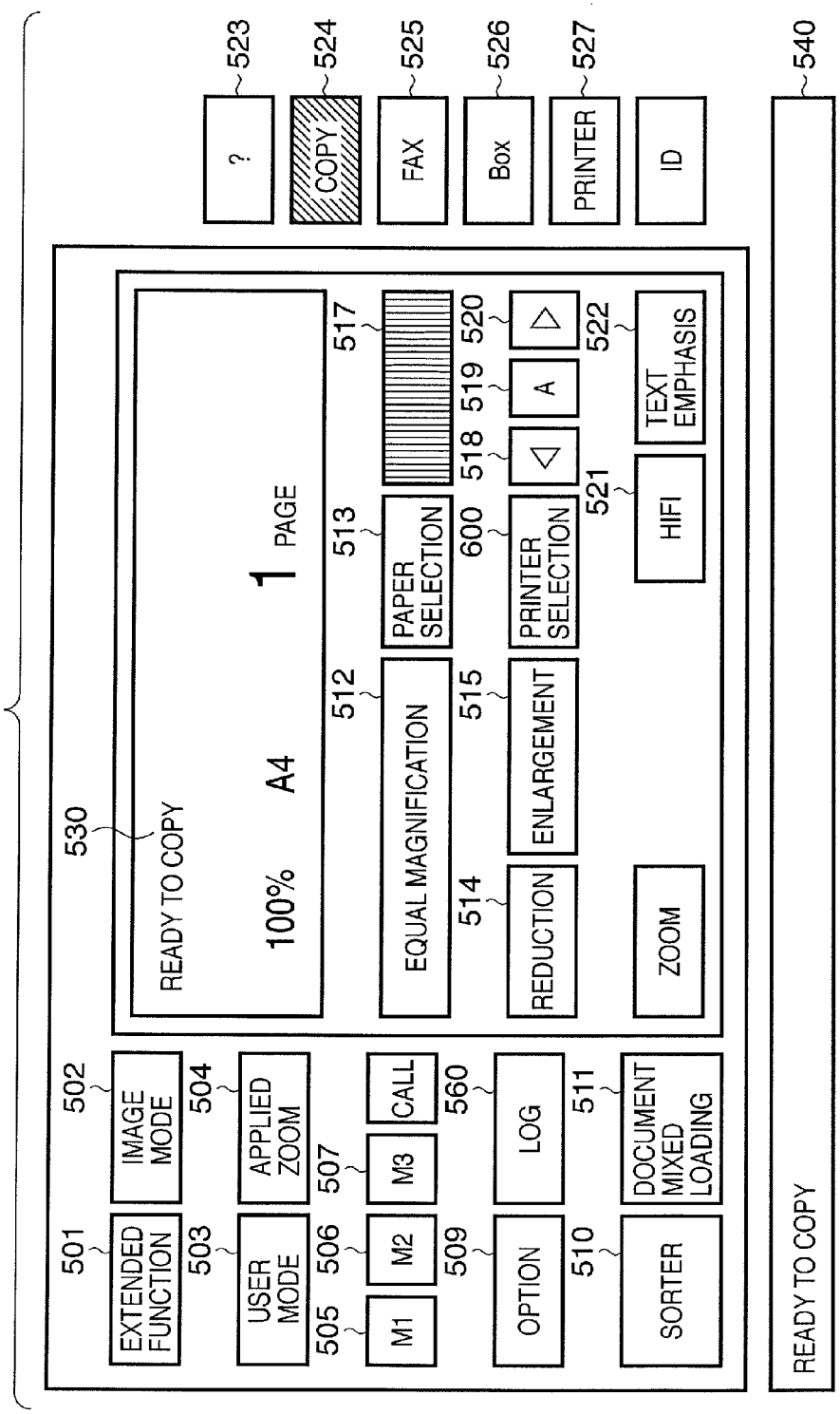
FIG. 5 is an explanatory view showing a basic dialog displayed on a display unit of an operation unit of the image processing apparatus according to the present embodiment.

FIG. 5 is an explanatory view showing a basic dialog displayed on the liquid crystal display unit of the operation unit 150 of the image processing apparatus 100.

The basic dialog shown in FIG. 5 is implemented by a touch panel, and when the user touches a frame of each individual displayed function, that function is executed. A copy mode key 524 is pressed when the user wants to perform a copy operation. Upon pressing the copy mode key 524, a copy mode window 530 is displayed. An extended function key 501 is pressed to enter a mode for settings of double-sided copy, multiple-copy, move, and binding margin, a setting of frame erasure, and the like.

A status line 540 displays messages indicating the device status and print information. In FIG. 5, the status line 540 displays that the apparatus is ready to copy.

An image mode key 502 is pressed to enter a setting mode required to apply hatching, shadow-casting, trimming, and masking to a copy image. A user mode key 503 is pressed to register a mode memory and to set a default mode dialog. An applied zoom key 504 is pressed to enter a mode for applying independent magnification processing in the X- and Y-directions of a document, and a zoom mode program for calculating the variable magnification ratio based on the document size and copy size. Each of an M1 key 505 M2 key 506, and M3 key 507 is pressed to call the registered mode memory. An option key 509 is pressed to make settings of an option function such as a film projector or the like so as to directly copy from a film. A sorter key 510 is pressed to make sort, non-sort, and group settings. A document mixed loading key 511 is pressed when A4- and A3-sized documents or B5- and B4-sized documents are set on a document feeder together.

An equal magnification key 512 is pressed to set a copy magnification to 100%. A reduction key 514 and enlargement key 515 are pressed to perform reduction and enlargement of given sizes. A paper selection key 513 is pressed to select copy paper. Density keys 518 and 520 are pressed to adjust the density. Every time the density key 518 is pressed, the copy density increases. Every time the density key 520 is pressed, the copy density decreases. A density indicator 517 changes its display contents to the right or left upon pressing of the density keys 518 and 520. An AE key 519 is pressed to automatically adjust the density of a document with a dark background like a newspaper and to copy such a document. A HiFi key 521 is pressed upon copying a document with a high halftone density like a photo document. A text emphasis key 522 is pressed to emphasize text upon copying a text document. A log key 560 is pressed to display log information of printed jobs. Upon pressing the log key 560, information including the end times user name, file name, the number of printed pages, and the like of each print job is displayed. A printer selection key 600 is pressed to select a receiving-side copying machine upon executing remote copy or tandem copy.

A guide key 523 is pressed when the user wants to know the function of a given key, and displays an explanation of that key. A FAX key 525 is pressed to execute FAX transmission/reception. A Box key 526 is pressed to display a Box function. A printer key 527 is pressed when the user wants to change the print density, or when he or she wants to refer to printout detailed information of PDL data from a remote client apparatus.

<Arrangement Example of Extended Control Apparatus 101 of The Present Embodiment>

(Hardware Arrangement Example of Extended Control Apparatus 101)

Figure 6:
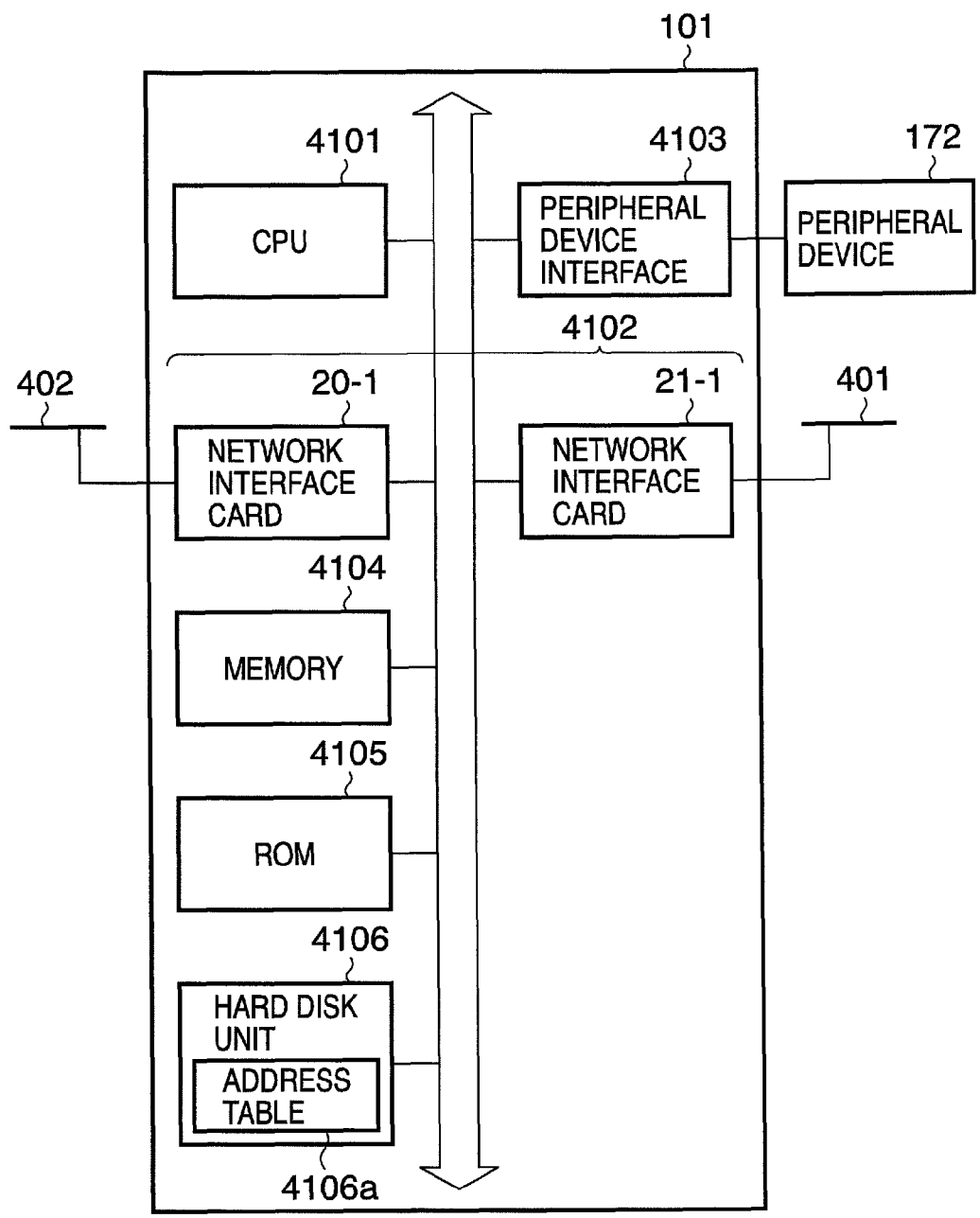
FIG. 6 is a block diagram showing the hardware arrangement of one extended control apparatus according to the present embodiment.

FIG. 6 is a block diagram showing an example of the hardware arrangement of the extended control apparatus 101 according to the present embodiment.

A CPU 4101 is a central processing unit which controls the overall extended control apparatus 101, and executes programs stored in a ROM 4105 and hard disk unit 4106. A network interface 4102 is a controller required to make data communications with other devices via a network.

Software executed by the CPU 4101 can exchange data in two ways with a print device or other network devices or other computers via the external LAN 400. A peripheral device interface 4103 is a controller required to control the peripheral device 172.

A memory 4104 is a volatile storage unit used to store instructions to be executed by the CPU 4101, data, and the like. The ROM 4105 is a read-only storage unit used to store programs, data, and the like required to execute basic hardware control. The hard disk unit 4106 is a nonvolatile storage unit used to store programs to be executed by the extended control apparatus 101, calculated data, and the like. The hard disk unit 4106 stores a boot program (startup program: a program for initiating executions (operations) of hardware and software), a plurality of applications, edit files, user files, network management programs, and the like. The hard disk unit 4106 has an address table 4106*a* required for a local address distribution unit (to be described later) to distribute non-overlapping local addresses.

The peripheral device interface 4103 is a controller which implements the specifications such as USB, RS-232C serial, IEEE1394, and the like, and is required to connect the peripheral device 172. The peripheral device 172 comprises, e.g., a user authentication device required to specify the user or the like. The local NIC 20-1 is a controller required to make data communications with the image processing apparatus 100 via the network. The external NIC 21-1 is a controller required to make data communications with client apparatuses on the external network via the network.

(Software Configuration Example of Extended Control Apparatus 101)

Figure 7:
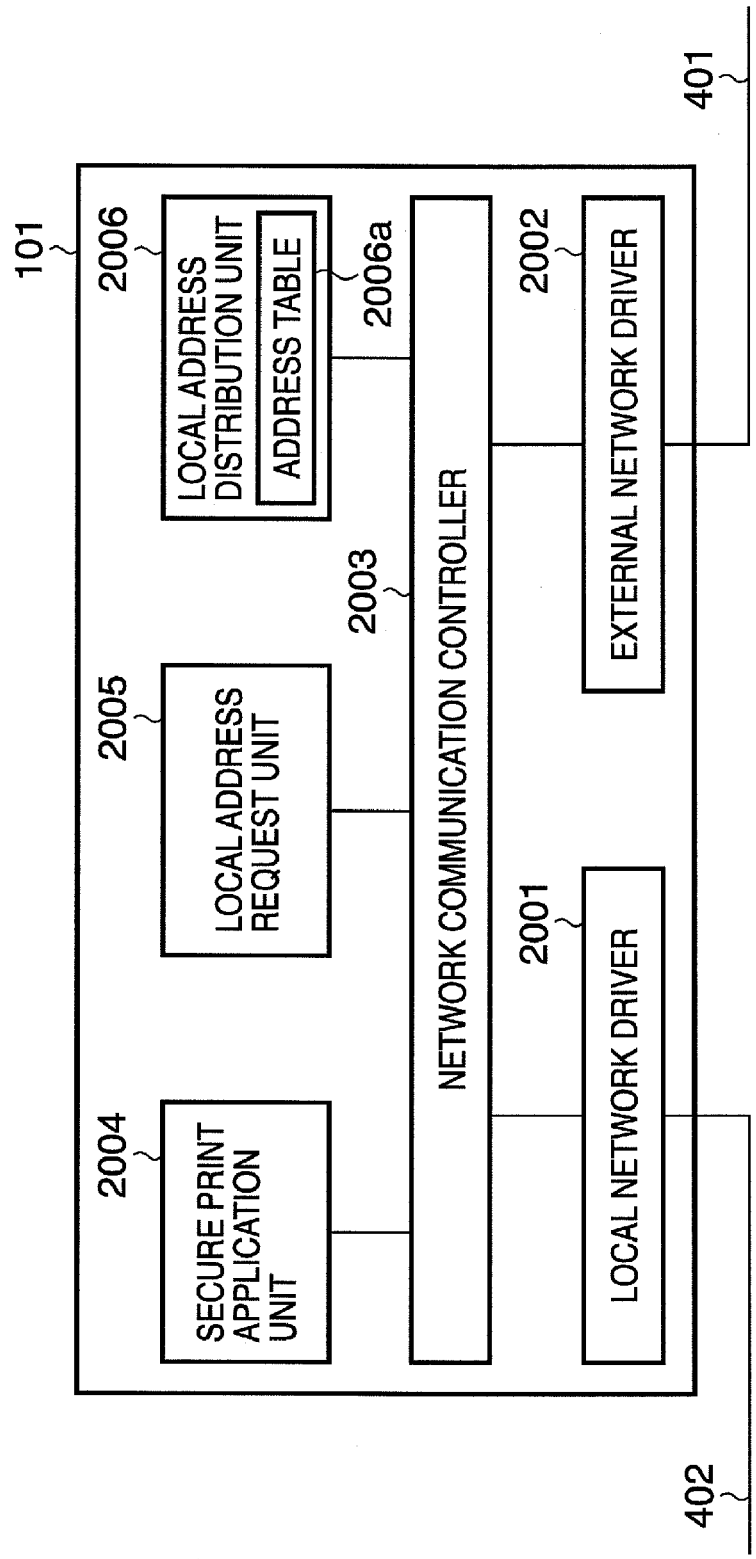
FIG. 7 is a block diagram showing the software module configuration of the extended control apparatus according to the present embodiment.

FIG. 7 is a block diagram showing an example of the software module configuration of the extended control apparatus 101 according to the present embodiment.

Software to be processed by the controller 171 incorporated in the extended control apparatus 101 is implemented as so-called firmware, and is executed by the CPU 4101 of the extended control apparatus 101.

A local network driver 2001 is connected to the internal LAN 402 to control the local NIC 20-1 and to exchange data with the image processing apparatus 100.

An external network driver 2002 is connected to the internal LAN 401 to control the NIC 21-1 and to exchange data with the extended control apparatus 102 and external LAN 400.

A network communication controller 2003 controls network communication protocols such as TCP/IP and the like, and exchanges data between the local side and external side.

A secure print application unit 2004 is required to execute an encrypted secured print function. More specifically, the secure print application unit 2004 receives an encrypted print job from the client PC 11 using an LPD protocol. The encrypted print job is stored in the hard disk unit 4106 intact. The secure print application unit 2004 decrypts the encrypted print job stored in the hard disk unit 4106 and actually prints that print job using the image processing apparatus 100 only when user authentication is confirmed.

The network communication controller 2003 examines all packets received by the local network driver 2001, and controls packets which are not related to the secure print application unit 2004 to pass through the apparatus to the external NIC 21-1. Also, the network communication controller 2003 examines all packets received by the external NIC 21-1, and controls packets which are not related to the secure print application unit 2004 to pass through the apparatus to the local NIC 20-1. Furthermore, upon reception of packets by the local network driver 2001, the network communication controller 2003 checks if both the NICs of the extended control apparatus 101 are set with network addresses. If it is determined that both the NICs are set with network addresses, the network communication controller 2003 controls packets other than those addressed to the apparatus to pass through the apparatus. If it is determined that both the NICs are not set with network addresses, the network communication controller 2003 captures the received packets without passing them through. Upon reception of packets by the external network driver 2002, the network communication controller 2003 controls packets other than those addressed to the apparatus to pass through the apparatus irrespective of whether or not the network addresses are set.

A local address request unit 2005 transmits a local address request packet which requests the local address of the local NIC 20-1. A local address distribution unit 2006 distributes the address of the NIC 21-2 of the extended control apparatus 102, which is daisy-chain connected to the apparatus, in response to a local address request packet from the extended control apparatus 102. The local address distribution unit (local address distribution module) 2006 has an address table 2006a (corresponding to 4106a in FIG. 6) used to distribute non-overlapping local addresses.

<Arrangement Example of Extended Control Apparatus 102 of The present Embodiment>

(Hardware Arrangement Example of Extended Control Apparatus 102)

Figure 8:
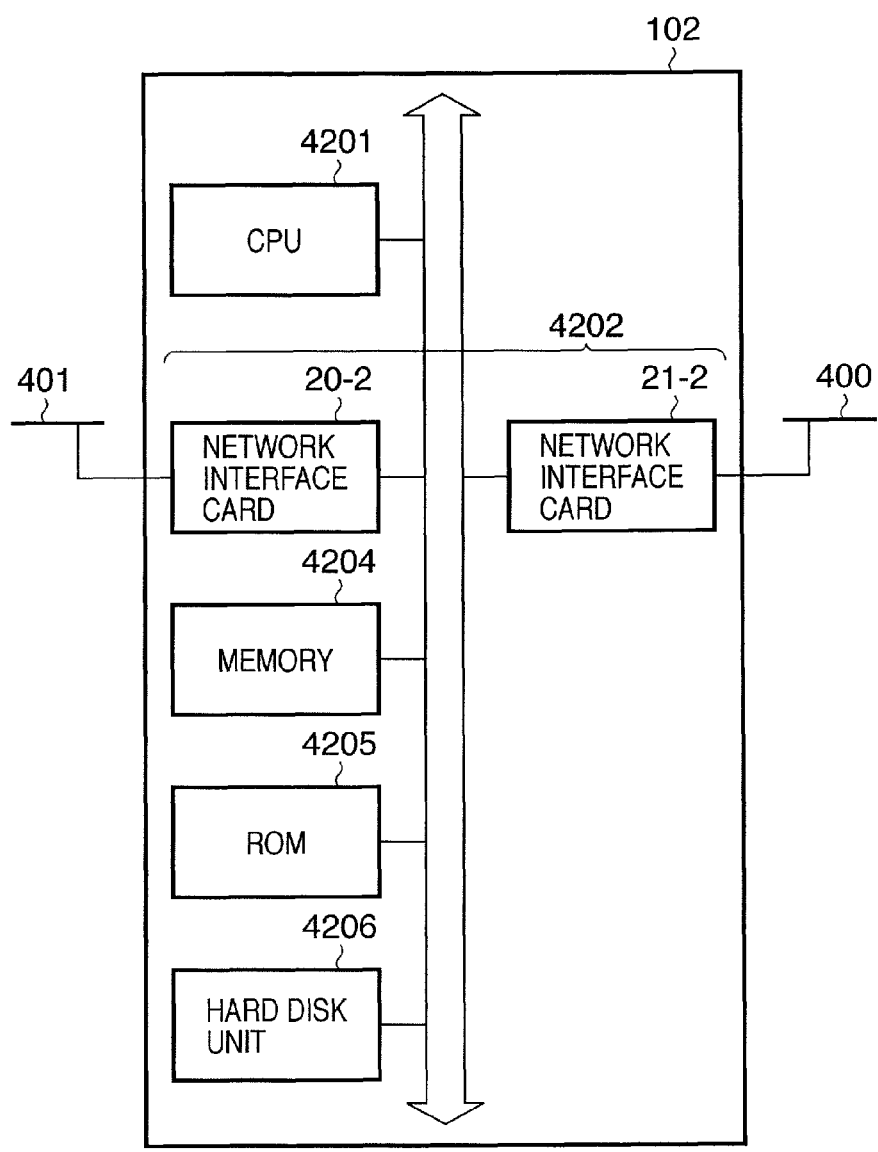
FIG. 8 is a block diagram showing the hardware arrangement of the other extended control apparatus according to the present embodiment.

FIG. 8 is a block diagram showing an example of the hardware arrangement of the extended control apparatus 102 according to the present embodiment.

A CPU 4201 is a central processing unit which controls the overall extended control apparatus 102, and executes programs stored in a ROM 4205 and hard disk unit 4206. A network interface 4202 is a controller required to make data communications with other devices via a network. Software executed by the CPU 4201 can exchange data in two ways with a print device or other network devices or other computers via the external LAN 400.

A memory 4204 is a volatile storage unit used to store instructions to be executed by the CPU 4201, data, and the like. The ROM 4205 is a read-only storage unit used to store programs, data, and the like required to execute basic hardware control. The hard disk unit 4206 is a nonvolatile storage unit used to store programs to be executed by the extended control apparatus 102, calculated data, and the like. The hard disk unit 4206 stores a boot program (startup program: a program for initiating executions (operations) of hardware and software), a plurality of applications, edit files, user files, network management programs, and the like.

The local NIC 20-2 is a controller required to make data communications with the image processing apparatus 100 via the network. The external NIC 21-2 is a controller required to make data communications with the client PC 11 on the external network via the network.

(Software Configuration Example of Extended Control Apparatus 102)

Figure 9:
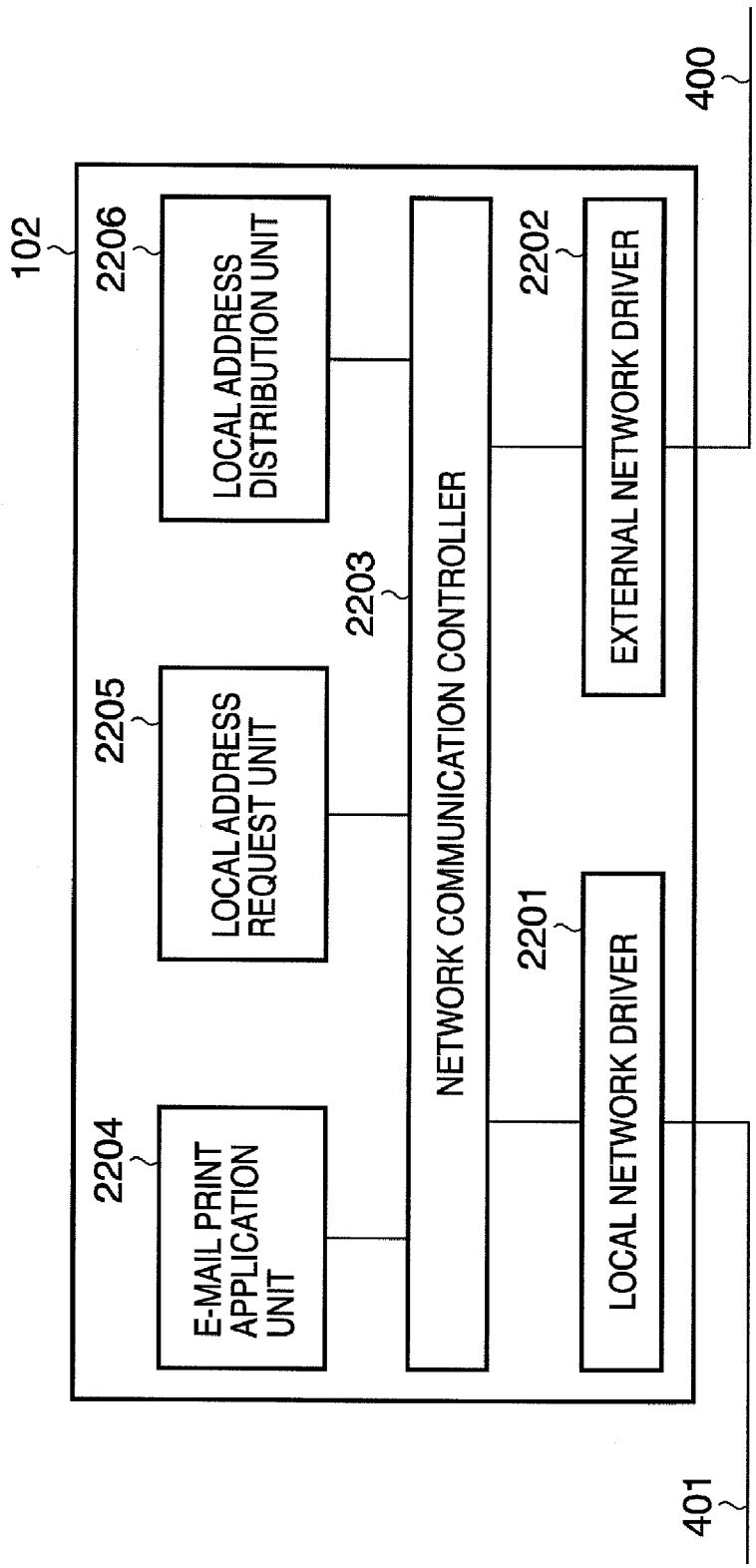
FIG. 9 is a block diagram showing the software module configuration of the extended control apparatus according to the present embodiment.

FIG. 9 is a block diagram showing an example of the software module configuration of the extended control apparatus 102 according to the present embodiment.

Software to be processed by the controller 173 incorporated in the extended control apparatus 102 is implemented as so-called firmware, and is executed by the CPU 4201 of the extended control apparatus 102.

A local network driver 2201 controls the local NIC 20-2 connected to the internal LAN 401, and exchanges data with the image processing apparatus 100 and extended control apparatus 101.

An external network driver 2202 is connected to the external LAN 400 to control the NIC 21-2 and to exchange data via the external LAN.

A network communication controller 2203 controls network communication protocols such as TCP/IP and the like, and exchanges data between the local side and external side.

An e-mail print application unit 2204 is required to transmit print information to the image processing apparatus 100 and to control it to print the print information. Such print information is received as an e-mail message including print information, which is transmitted from the client PC 11 using an SMTP protocol or POP protocol.

A local address request unit 2205 transmits a local address request packet which requests the local address of the NIC 20.

The network communication controller 2203 examines all packets received by the local network driver 2201, and controls packets which are not related to the e-mail print application unit 2204 to pass through the apparatus to the external NIC 21-2. Also, the network communication controller 2203 examines all packets received by the external NIC 21-2, and controls packets which are not related to the e-mail print application unit 2204 to pass through the apparatus to the local NIC 20-2. Furthermore, upon reception of packets by the local network driver 2201, the network communication controller 2203 checks if both the NICs of the extended control apparatus 101 are set with network addresses. If it is determined that both the NICs are set with network addresses, the network communication controller 2203 controls packets other than those addressed to its own apparatus to pass through the apparatus. If it is determined that both the NICs are not set with network addresses, the network communication controller 2203 captures the received packets without passing them through. Upon reception of packets by the external network driver 2202, the network communication controller 2203 controls packets other than those addressed to its own apparatus to pass through the apparatus irrespective of whether or not the network addresses are set.

A local address distribution unit (local address distribution module) 2206 distributes the address of the local NIC of the extended control apparatus, which is daisy-chain connected to the apparatus, in response to a local address request packet.

<Startup Sequence Example of Extended Image Processing System of The Present Embodiment>

The local address request sequence according to the present embodiment will be described below. More specifically, operations until the network addresses of the extended control apparatuses 101 and 102, which are daisy-chain connected to the image processing apparatus 100, are set and the image processing apparatus 100 communicates with a device on the LAN 400 will be described.

Figure 10:
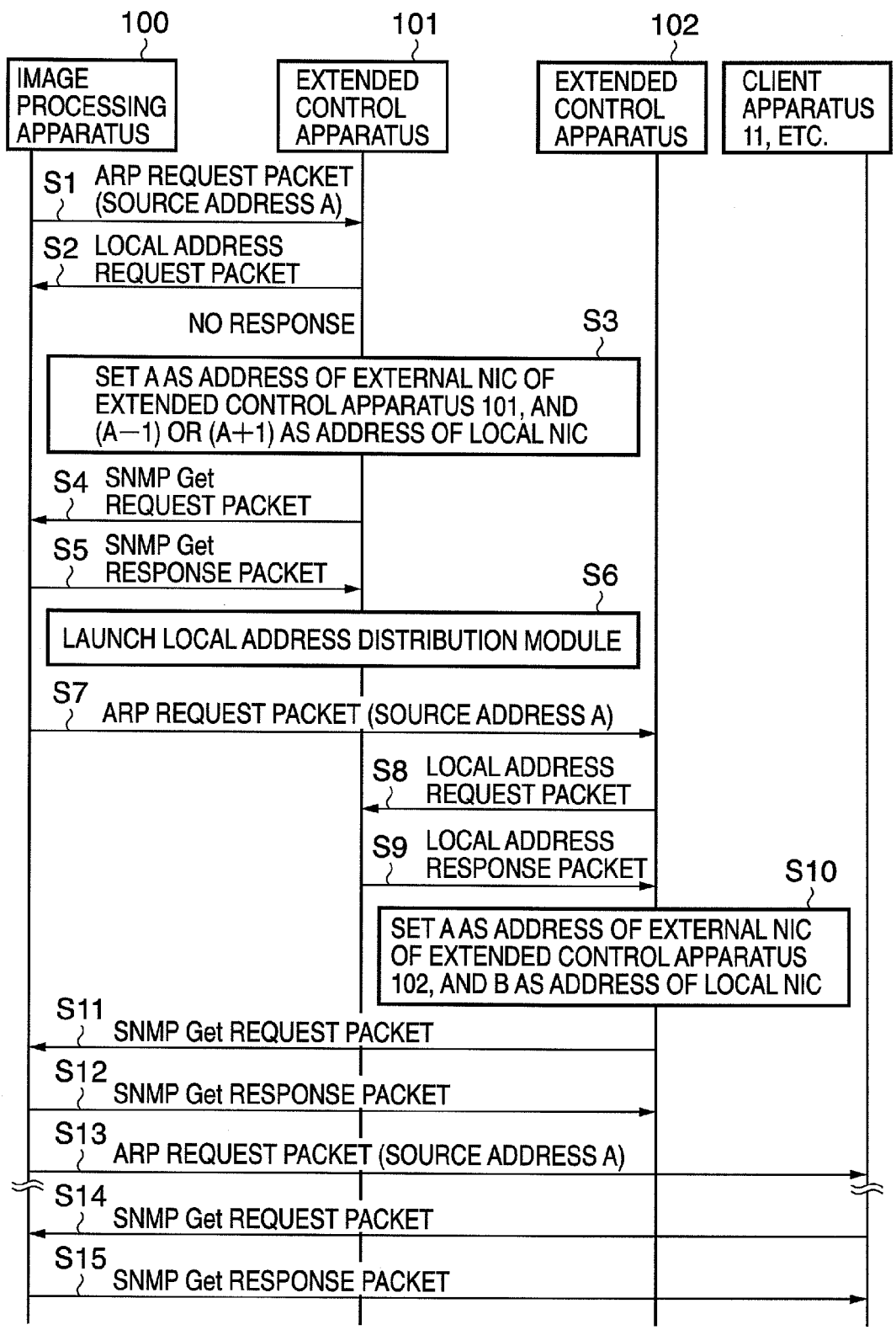
FIG. 10 is a chart showing an example of a local address request sequence according to the present embodiment.

FIG. 10 is a chart showing the local address request sequence from when the daisy-chain connected extended control apparatuses 101 and 102 according to the present embodiment start up until they settle network settings. Note that the time axis is assured to progress from the top down in the vertical direction.

During a period from when the extended control apparatuses start up until they settle the network settings of the NICs, all packets received by the local NIC do not pass through the apparatus to the external NIC. In other words, all the packets received by the local NIC are captured by the network communication controller. On the other hand, all packets received by the external NIC pass through the apparatus to the local NIC.

(Sequence S1) The image processing apparatus 100 transmits an ARP request packet to the client PC 11 prior to communications with the client PC 11 on the external network. The network communication controller 2003 of the extended control apparatus 101 captures the ARP request packet, and acquires the source IP address and source MAC address of that packet. Note that the extended control apparatus 101 does not return any response to the ARP request packet. Therefore, the image processing apparatus 100 re-transmits the ARP request packet to the client PC 11 after an elapse of a predetermined period of time.

(Sequence S2) The local address request unit 2005 of the extended control apparatus 101 transmits a local address request packet addressed to the image processing apparatus 100 from the local NIC 20-1. Since the image processing apparatus 100 does not incorporate any module that can respond to the local address request packet, it does not return any response.

(Sequence S3) The extended control apparatus 101 sets the source IP address and source MAC address acquired from the ARP request packet as those of the external NIC 21-1. Note that since no response is returned in response to the local address request packet, the extended control apparatus 101 sets a value calculated from the IP address of the external NIC 21-1 (by adding or subtracting 1 from that address) as the IP address of the local NIC 20-1. In this way, the network settings of the extended control apparatus 101 are completed.

(Sequence S4) After the addresses of the local NIC 20-1 and external NIC 21-1 of the extended control apparatus 101 are settled, the extended control apparatus 101 sends an SNMP Get request packet to the source of the ARP request packet so as to acquire the product name, device type, and the like.

(Sequence S5) If the appropriate product name, device type, and the like can be acquired based on an SNMP Get response packet from the image processing apparatus 100, the extended control apparatus 101 shifts to a normal operation state.

At this time, since the network settings of the NICs of the extended control apparatus 101 are settled, the network communication controller 2003 of the extended control apparatus 101 passes through packets from the image processing apparatus 100 if they are not addressed to the apparatus. On the other hand, the network communication controller 2003 passes packets from the external network through if they are not addressed to its own apparatus.

(Sequence S6) The extended control apparatus 101 which determines the address of the local NIC 20-1 by itself launches the local address distribution module.

(Sequence S7) The image processing apparatus 100 re-sends an ARP request packet since the ARP request packet transmitted in sequence S1 results in an error. The network communication controller 2003 of the extended control apparatus 101 passes the ARP request packet which is not addressed to the apparatus through. The network communication controller 2203 of the extended control apparatus 102 captures the ARP request packet since network address settings are not completed, and acquires the source IP address and source MAC address of the packet. Note that the extended control apparatus 102 does not return any response to the ARP request packet. Therefore, the image processing apparatus 101 re-sends an ARP request packet addressed to the client PC 11 after an elapse of a predetermined period of time.

(Sequence S8) The local address request unit 2205 of the extended control apparatus 102 generates a local address request packet, and transmits it from the local NIC 20-2 to the extended control apparatus 101.

(Sequence S9) Upon reception of the local address request packet, the local address distribution module of the extended control apparatus 101 returns a local address response packet which includes a local address to be assigned to the extended control apparatus 102 in a data part. Note that the local address to be assigned is determined based on the address table 2006a. Alternatively, the extended control apparatus 102 may be notified of the local address set in the extended control apparatus 101, and may determine an address which does not overlap that address.

(Sequence S10) The source IP address and source MAC address acquired from the ARP request packet are set as those of the external NIC 21-2 of the extended control apparatus 102. Upon reception of the local address response packet, the extended control apparatus 102 sets the address included in the data part of the response packet as that of the local NIC 20-2. In this way, the network settings of the extended control apparatus 102 are complete.

(Sequence S11) After the addresses of the local NIC 20-2 and external NIC 21-2 are settled, the extended control apparatus 102 sends an SNMP Get request packet to the source of the ARP request packet in order to acquire the product name, device type, and the like.

(Sequence S12) If the appropriate product name, device type, and the like can be acquired based on an SNMP Get response packet from the image processing apparatus 100, the extended control apparatus 102 shifts to a normal operation state.

At this time, in the extended image processing system including the image processing apparatus 100, extended control apparatus 101, and extended control apparatus 102, the normal operation state which is seen as one apparatus from the external LAN 400 is settled.

(Sequence S13) The image processing apparatus 100 transmits an ARP request packet again to the client PC 11 prior to communications with the client PC 11 on the external network. That is, the image processing apparatus 100 re-sends an ARP request packet since the ARP request packet transmitted in sequence S7 resulted in an error. The network communication controllers 2003 and 2203 of the extended control apparatuses 101 and 102 pass the ARP request packet which is not addressed to its own apparatuses through. The client PC 11 captures the ARP request packet, and acquires the source IP address and source MAC address of the packet. After that, the client PC 11 sends an ARP response including the MAC address of the client PC to the image processing apparatus 100 as a response to the ARP request.

(Sequence S14) After that, the client PC 11 sends an SNMP Get request packet to the source of the ARP request packet so as to acquire the product name, device type, and the like.

(Sequence S15) The client PC 11 acquires the appropriate product name, device type, and the like based on an SNMP Get response packet from the image processing apparatus 100, and makes access such as print processing or the like to the extended image processing system.

In the example shown in FIG. 10, the image processing apparatus 100 repeats transmission of an ARP request packet in sequences S1, S7, and S13. However, the extended control apparatus 101 may alternatively transmit an ARP request packet in sequence S7, and the extended control apparatus 102 may alternatively transmit an ARP request packet in sequence S13. Such processing can be implemented by adding an alternative processing function to each extended control apparatus, and the number of extended control apparatuses to which the image processing apparatus 100 is connected need not be taken into consideration, resulting in simple control.

(Operation Sequence Example of Image Processing Apparatus 100)

Figure 11:
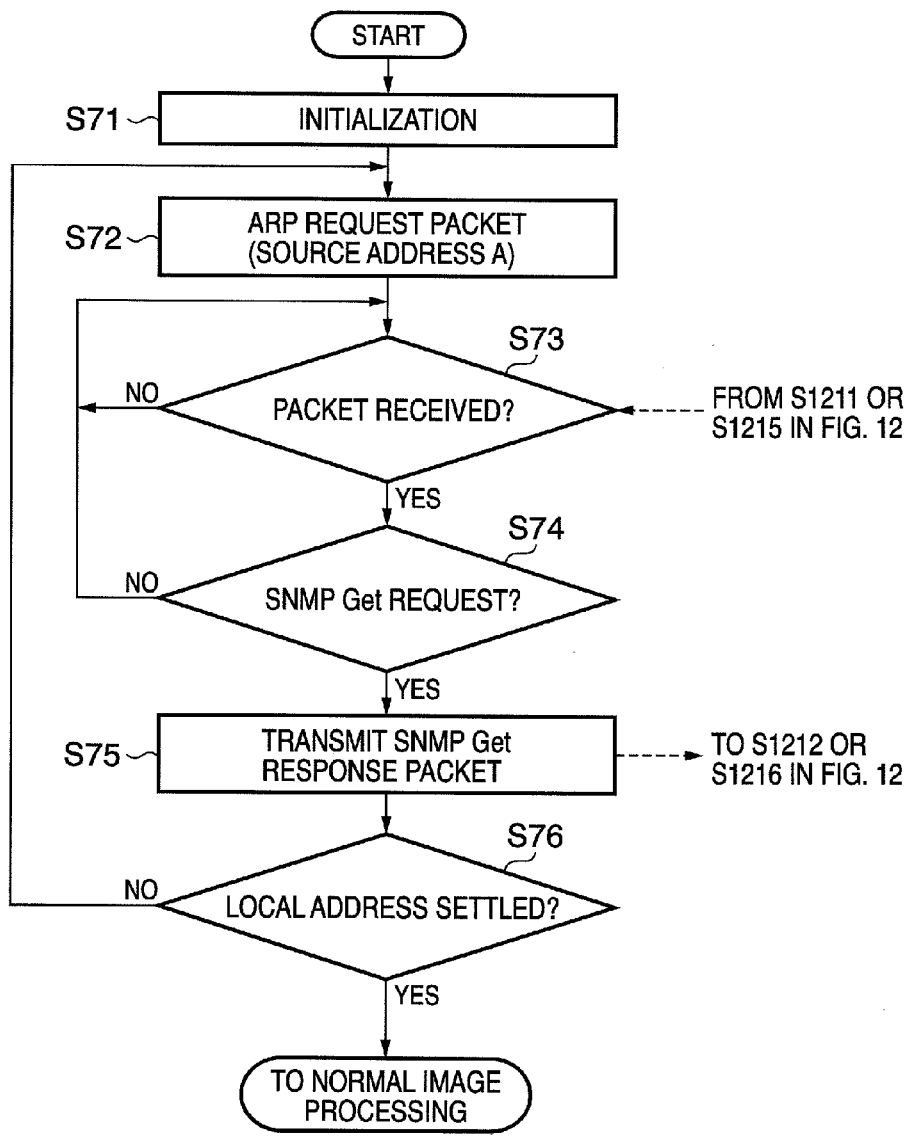
FIG. 11 is a flowchart showing the processing sequence in the image processing apparatus upon settlement of the local addresses according to the present embodiment.

FIG. 11 is a flowchart showing an example of the processing sequence in the image processing apparatus 100 upon settlement of the local addresses according to the present embodiment.

In step S71, the apparatus is initialized at the time of startup. After that, when the user operates the image processing apparatus 100 to designate a communication with any device on the LAN 400, the controller apparatus 110 sends an ARP request packet (source address A in the present embodiment) to that device in step S72.

In step S73, the controller apparatus 110 waits for reception of a packet. If a packet is received, the process advances to step S74 to check if the received packet is an SNMP Get request packet (see S1211 and S1215 in FIG. 12). If it is determined in step S73 that the received packet is not an SNMP Get request packet, the process returns to step S73. Note that a predetermined period of time is set, and if the SNMP Get request packet cannot be received within the predetermined period of time, a time-out error occurs. Upon reception of the SNMP Get request packet, the controller apparatus 110 returns an SNMP Get response packet including the appropriate product name, device type, and the like in step S75 (transmit SNMP Get response packet).

The controller apparatus 110 checks in step S76 if the local addresses of all the connected extended controller apparatuses are settled. If the local addresses are not settled yet, the process returns to step S72 to send an ARP request packet again. If the local addresses of all the connected extended controller apparatuses are settled, the controller apparatus 110 enters the procedure of normal image processing.

In case of the arrangement in which the extended control apparatus alternatively sends an ARP request packet, step S76 is excluded. Furthermore, a route that returns from step S75 to step S73, and a route for checking whether or not the received packet is an image processing request packet if it is determined in step 574 that the received packet is not an SNMP Get request packet may be added.

<Processing Sequence Example of Packet Controller of Extended Control Apparatus>

Figure 12:
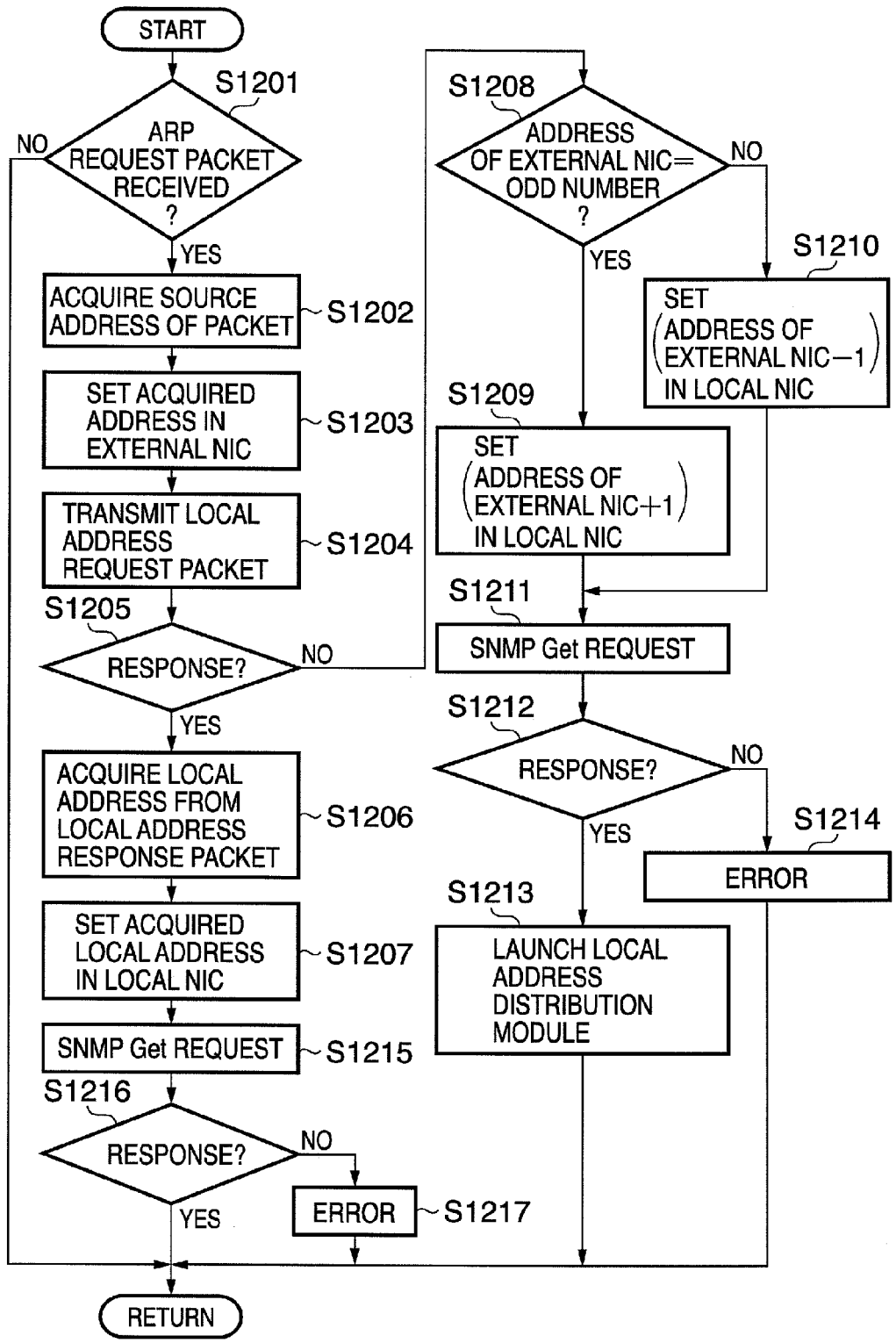
FIG. 12 is a flowchart showing the processing sequence of a packet controller of the extended control apparatus according to the present embodiment.

FIG. 12 is a flowchart showing an example of the processing sequence of the network communication controllers 2003 and 2203 of the extended control apparatuses 101 and 102 according to the present embodiment.

This processing is executed upon reception of packets by the local NIC 20 during a period from when the extended control apparatuses 101 and 102 start up until the addresses of the NICs are determined. Note that a case will be explained wherein processing is done using a common flowchart independently of the connected positions of the extended control apparatuses 101 and 102, and expressions "local NIC 20" and "external NIC 21" will be used in the following description. However, different flowcharts may be used for the extended control apparatus connected to the image processing apparatus 100 and other extended control apparatuses.

During a period from when the extended control apparatus starts up until the addresses of the NICs are determined, all packets received by the local NIC are captured without passing through the apparatus to the external NIC. All packets received by the external NIC pass through the apparatus to the local NIC.

The network communication controller checks in step S1201 if the received packet is a TCP/IP packet (i.e., to check if an ARP request packet is received). If the result is YES in step S1201, the process advances to step S1202; otherwise, the process ends.

In step S1202, the network communication controller acquires the source address from the packet (address A of the image processing apparatus 100 in the present embodiment). In step S1203, the network communication controller sets acquired source address A as that of the external NIC 21.

In step S1204, the network communication controller sends a local address request packet from the local NIC 20. The network communication controller checks in step S1205 if a response is received. If the result is YES in step S1205, the process advances to step S1206; otherwise, the process advances to step S1208.

If the extended control apparatus is directly connected to the image processing apparatus 100 (in case of the extended control apparatus 101 in the present embodiment), since the image processing apparatus 100 does not incorporate any module that responds to the local address request packet, no response returns. Hence, the process advances to step S1208.

The network communication controller checks in step S1208 if the address of the external NIC is an odd number. If the result is YES in step S1208, the process advances to step S1209; otherwise, the process advances to step S1210. In step S1209, the network communication controller sets (the address of the external NIC+1) as that of the local NIC. In step S1210, the network communication controller sets (the address of the external NIC−1) as that of the local NIC.

In step S1211, the network communication controller sends an SNMP Get request packet from the local NIC in order to confirm whether the local NIC can communicate with the image processing apparatus 100. The image processing apparatus 100 which incorporates an SNMP agent outputs a response packet in response to this SNMP packet. Since the extended control apparatus does not incorporate any SNMP agent, it does not respond.

The network communication controller checks in step S1212 if a response is received. If the result is YES in step S1212, the process advances to step S1213; otherwise, the process terminates as an error in step S1214. In step S1213, the network communication controller launches the local address distribution module. After that, the launched local address distribution module processes a local address request packet received by the external NIC.

If it is determined in step S1205 that the extended control apparatus is not directly connected to the image processing apparatus 100 (in case of the extended control apparatus 102 in the present embodiment), the local address distribution module of the extended control apparatus 101 responds to a local address request packet. Hence, the process advances to step S1206.

In step S1206, the network communication controller acquires the local address from the local address response packet. In step S1207, the network communication controller sets the acquired local address as that of the local NIC 20.

In step S1215, the network communication controller sends an SNMP Get request packet from the local NIC in order to confirm whether the local NIC can communicate with the image processing apparatus 100. The image processing apparatus 100 which incorporates an SNMP agent outputs a response packet in response to this SNMP packet. Since the extended control apparatus does not incorporate any SNMP agent, it does not respond.

The network communication controller checks in step S1216 if a response is received. If the result is YES in step S1216, the process ends since it is determined that the addresses are normally settled. If the result is NO in step S1216, the process terminates as an error in step S1217.

As described above, the flowchart indicating the operation of the extended control apparatus (e.g., extended control apparatus 101) directly connected to the image processing apparatus without the intervention of another extended control apparatus between the image processing apparatus and itself is defined by steps S1201 to S1205 and steps S1208 to S1214. On the other hand, the flowchart indicating the operation of the extended control apparatus (e.g., extended control apparatus 102) directly connected to the image processing apparatus with the intervention of another extended control apparatus between the image processing apparatus and itself is defined by steps S1201 to S1207 and steps S1215 to S1217.

<Processing Sequence Example of Local Address Distribution of Extended Control Apparatus>

Figure 13:
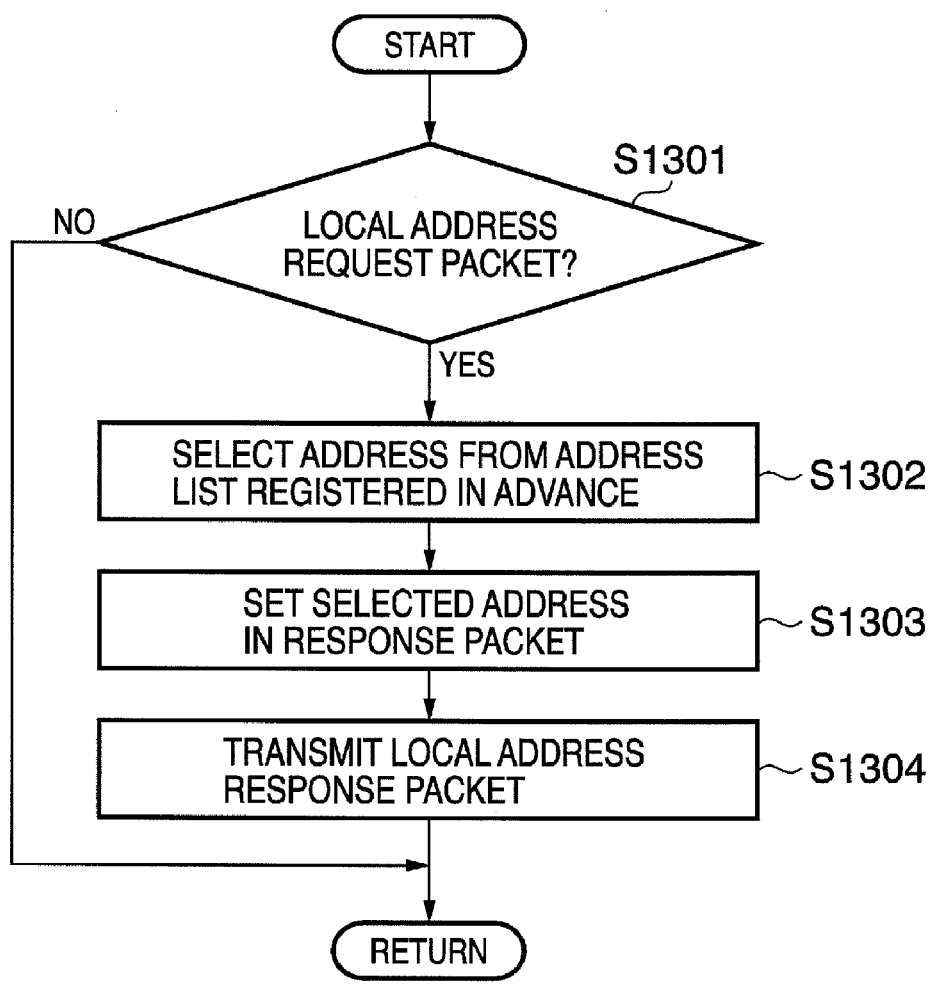
FIG. 13 is a flowchart showing the processing sequence of a local address distribution module which runs on the extended control apparatus according to the present embodiment.

FIG. 13 is a flowchart showing an example of the processing sequence of the local address distribution units (local address distribution modules) 2006 and 2206 which run on the extended control apparatuses according to the present embodiment. This processing is executed upon reception of a packet by the external NIC.

The local address distribution module checks in step S1301 whether the received packet is a local address request packet. If the result is YES in step S1301, the process advances to step S1302; otherwise, the process ends.

In step S1302, the local address distribution module selects an address from an address list registered in advance (see the address table 4106a in FIG. 6 and the address table 2006a in FIG. 7). More specifically, if the network address is determined in the extended control apparatus, the local address distribution unit 2006 registers network addresses to be distributed in the address table 2006a. The network addresses to be registered can assume arbitrary values. For example, if the address of the local NIC is (address of the external NIC+1), the local address distribution unit registers network addresses with values obtained by adding 2, 3, 4, . . . , to the address of the external NIC in the address table. If the address of the local NIC is (address of the external NIC−1), the local address distribution unit registers network addresses with values obtained by subtracting 2, 3, 4, . . . , from the address of the external NIC in the address table. The number of network addresses to be registered can be an arbitrary value.

In step S1302, the local address distribution module selects addresses different from the network addresses of the external NIC and local NIC of itself from the network addresses registered in advance in the address table, and determines them as the addresses to be distributed to the extended control apparatus 102. After the local address distribution module deletes the selected addresses from the address table 2006a or checks them to be able to identify that these addresses have already been selected, the process advances to step S1303.

In the description of the present embodiment, the network addresses to be distributed are registered in the address table 2006a. Alternatively, a method of registering the network address set for itself in the address table 2006a may be adopted. That is, according to the setting of the network address of itself, that value is written in the address table. Then, upon reception of a local address request packet, an arbitrary address other than that registered in the address table may be generated and may be determined as the address to be distributed. In this case, the address generated as those to be distributed is additionally registered in the address table. In this way, the identical network addresses can be prevented from being distributed to a plurality of extended control apparatuses.

In step S1303, the local address distribution module sets the selected address in a response packet. In step S1304, the local address distribution module transmits the local address response packet from the external NIC, thus ending the processing.

<Configuration Example of Local Address Request/Response Packet of The Present Embodiment>

An implementation example of a local address request packet unique to the present embodiment using the TCP/IP protocol will be described below. The protocol required for the local address request packet unique to the present embodiment will be referred to as a configurator protocol hereinafter. In the present embodiment, the configurator protocol is implemented on an UDP (User Datagram Protocol). Note that the configurator protocol allows communications based on the MAC address without using any IP addresses. That is, the configurator protocol communicates with a device whose IP address is not set using the MAC address, and can set an IP address or the like in that device. The present embodiment communicates the local address request packet using the configurator protocol.

(Example of Packet Header)

Figure 14:
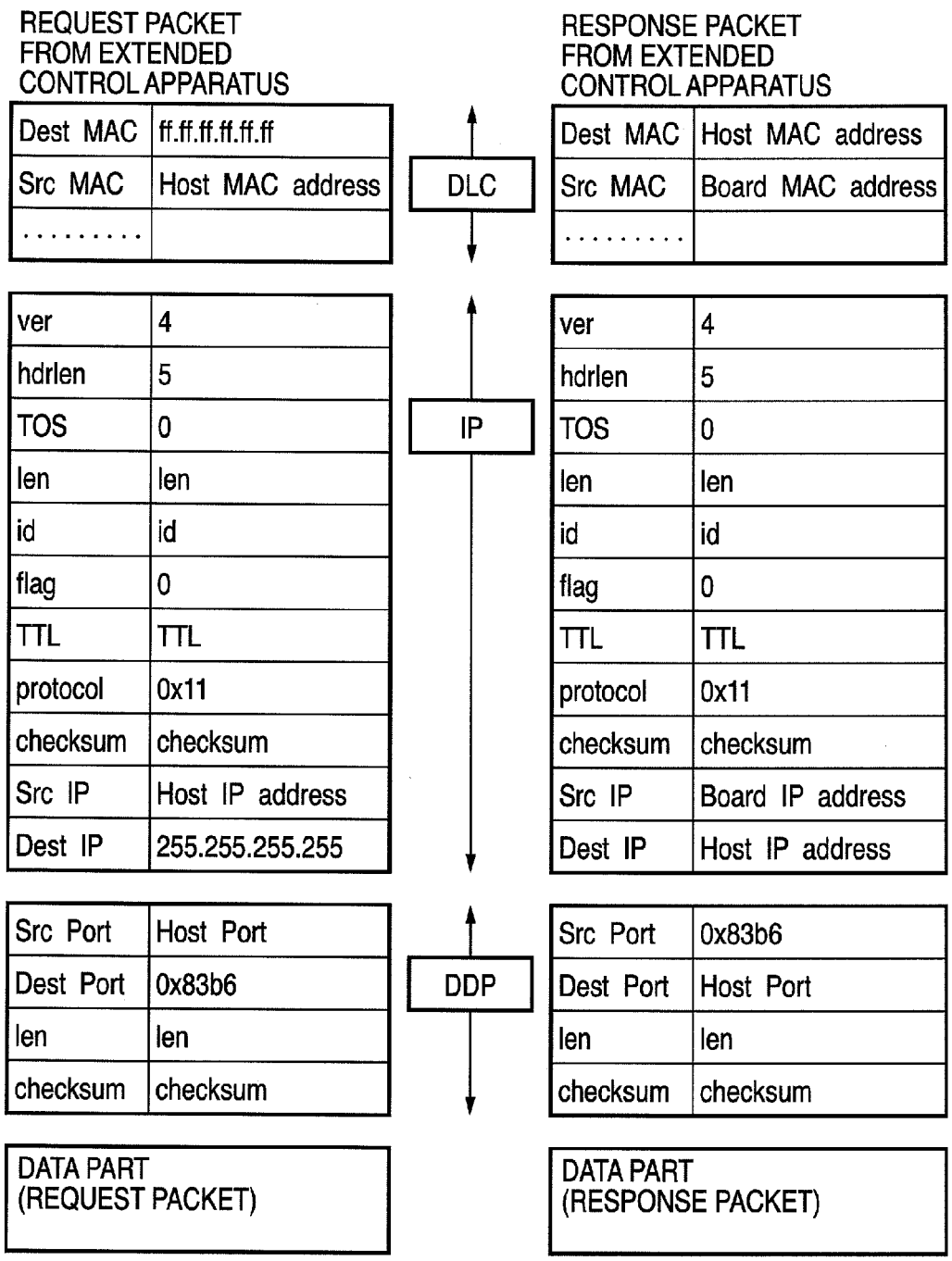
FIG. 14 is an explanatory view showing an example of the packet header of a configurator protocol.
Figure 16:
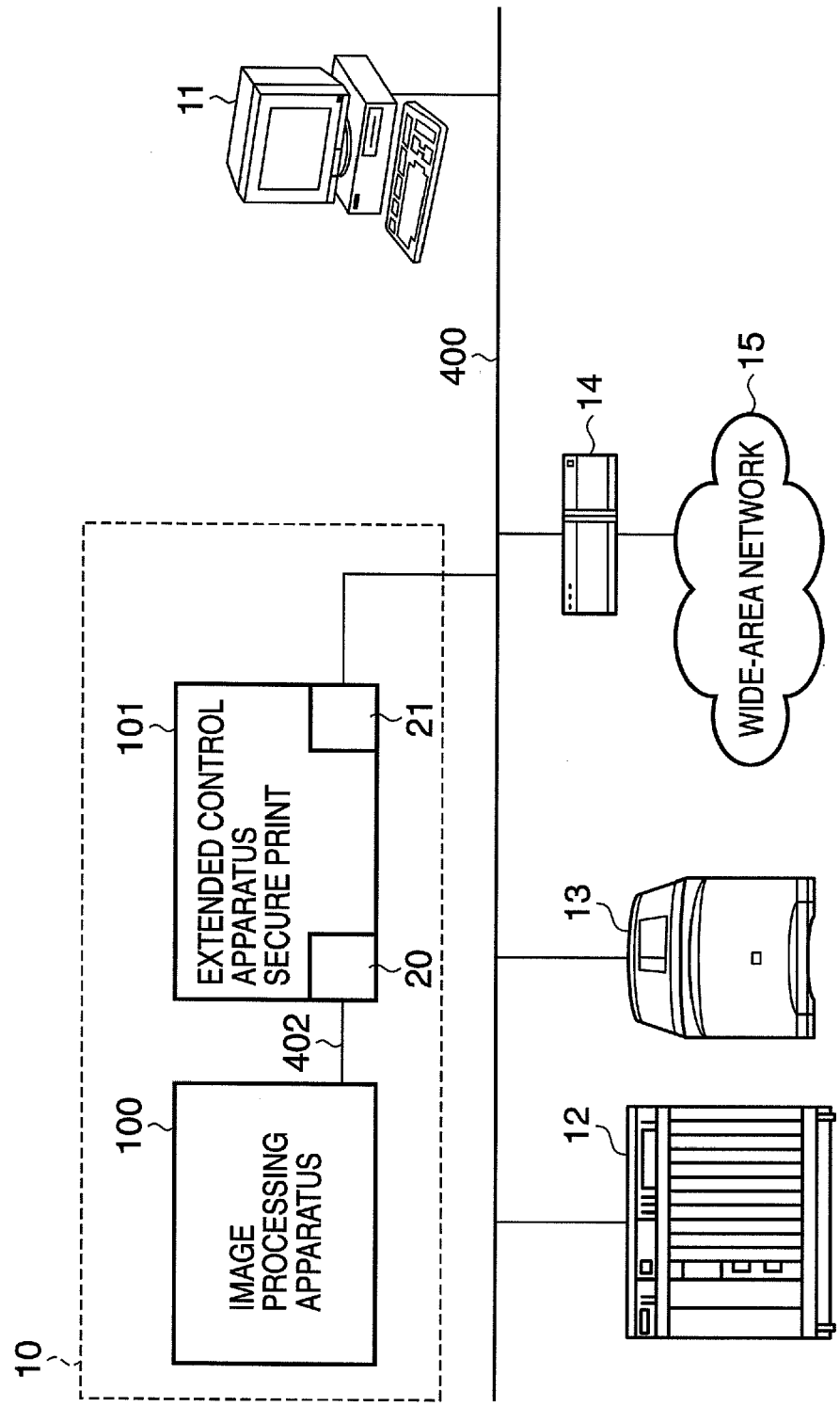
FIG. 16 is a diagram showing an example of a network environment that uses a conventional extended image processing system.
Figure 17:
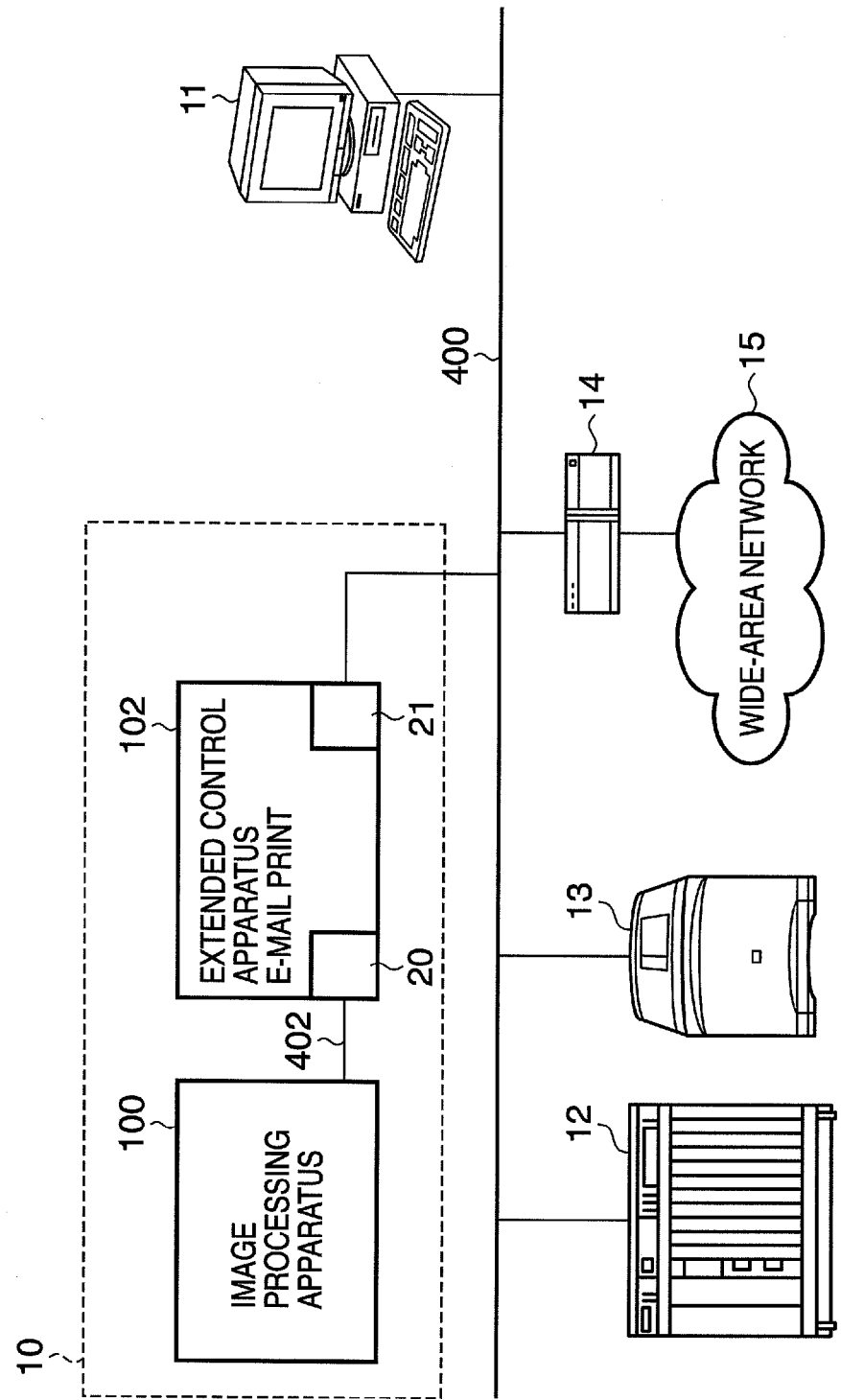
FIG. 17 is a diagram showing another example of a network environment that uses a conventional extended image processing system.

FIG. 14 is an explanatory view showing an example of the packet header of the configurator protocol.

The configurator protocol uses a UDP port number 0x83b6. Then, the IP address (Dest IP) of the destination in the request packet is set to be "255.255.255.255", and the MAC address thereof (Dest MAC) is set to be "0xffffffffffff".

Note that the MAC address is a physical address unique to a device. In the case of Ethernet®, the MAC address has a 6-byte length. Of the 6-byte length, the first 3 bytes are managed and assigned as a vendor code by IEEE (Institute of Electrical and Electronic Engineers) The remaining 3 bytes specify a code uniquely managed by each vendor (not to overlap each other). As a result, there are no network devices having the same physical addresses worldwide, and all different addresses are assigned to network devices.

If the MAC address is "0xffffffffffff", that packet is handled as a broadcast packet, and all network devices connected on the network receive this packet.

(Configuration Example of Data Part of Packet)

The data part of the packet in the configurator protocol will be described below.

FIG. 15 is a schematic view showing the structure of the data part of the packet in the configurator protocol. Details of respective parameters are as follows.

(1) Version (2 bytes): indicates the version This version is assumed to be 0x0301.

(2) Request code: a code indicating a function to be requested by this packet
  0: Set (set)
  1: Get (browse)
  2: NVRAM-Reset (reset by an NVRAM value)
  3: Factory-Reset (reset by a factory initial value)
  4: Discovery (find)
  5: Local Address Request (local address request)

(3) Result code (2 bytes): a code indicating the requested result
  0x0000: success
  0x0001: abnormal media type
  0x0002: no designated protocol stack
  0x0003: abnormal version
  0xFFFF: unspecified error (4) Media type (2 bytes): indicates a communication medium
  0: Ethernet®

(5) Protocol information: a flag corresponding to each individual protocol information When the Request code is 0 (set), only information associated with a protocol with the corresponding byte="1" is set.

(6) NetWare information: a field used to set and browse information associated with Netware
  Frame type (2 bytes): a frame type used in NetWare
  <EtherNet>
  0: Disable (NetWare disabled)
  1: 802.3
  2: 802.2
  4: EtherNet II
  8: 802.2SNAP (7) TCP/IP information: a field used to set and browse information associated with TCP/IP
  Frame type (2 bytes): a frame type used in TCP/IP
  0: Disable (TCP/IP disabled)
  4: EtherNet II
  IP Mode (2 bytes)
  Operation mode (2 bytes)
  The following values are ORed upon browsing.
  0: IP fixed (launched based on an NVRAM value)
  1: BOOTP valid
  2: RARP valid
  4: DHCP valid
  IP address (4 bytes): an IP address of a network board
  Gateway address (4 bytes): a gateway of the network board
  Subnet mask (4 bytes): a subnet mask of the network board
  Broadcast address (4 bytes): a broadcast address of the network board (8) AppleTalk information: a field used to set and browse information associated with AppleTalk
  Frame type (2 bytes); a frame type used in AppleTalk
  0: Disable (AppleTalk disabled)
  2: Phase2

(9) MAC address: a MAC address of the board

If the MAC address value stored in this field does not match that of the network address except for a case in which the Request code 4 (Discovery), this packet is ignored.

Note that individual values are determined to be values called factory initial values determined in advance upon factory shipping.

Using such a configurator protocol, a local address request can be transmitted, and a local address to be set can be acquired via a local address response.

Other Embodiments

The present embodiment has been explained as an image processing system as an extended image processing apparatus. However, the present invention relates to the settings of the local addresses of daisy-chain connected extended function units, and can be applied to any other systems without being limited to the image processing apparatus. The present invention also includes such applications.

In the present embodiment, the processing described so far can be similarly executed for a case wherein the connection order of the extended control apparatuses 101 and 102 is reversed or even a case wherein another extended control apparatus is added. Furthermore, when another extended control apparatus is added, the added extended control apparatus transmits a local address request packet to the extended control apparatus 101. The local address distribution unit 2006 of the extended control apparatus 101 selects an address which is not assigned to any apparatus from those registered in the address table 2006a, and determines it as an address to be distributed to the added extended control apparatus.

Moreover, the present invention explained the case that each extended control apparatus physically includes two network interface cards. However, these network interface cards may be physically incorporated as one board. In other words, each extended control apparatus may include each communication unit with the local network and the external network. For example, the network interface card 20-1 and network interface card 21-1 shown in FIG. 6 may be a united structure.

In the description of the present embodiment, the extended control apparatus 101 provides the secure print function, and the extended control apparatus 102 provides the e-mail print function. However, the present invention is not limited to such specific functions. For example, various removable storages (a magneto-optical media drive, USB storage, memory card represented by SmartMedia™, CompactFlash™, or the like, and so forth) are connected as peripheral devices to the extended control apparatus. The present invention may be applied to a media application function that passes documents stored in memory media to the image processing apparatus 100 to print, transmit, or file them. Also, the present invention may be applied to a media application function that allows the image processing apparatus 100 to receive image-scanned or received documents or filed documents and to store them in memory media. Also, one extended control apparatus may provide a plurality of functions.

The local interface is an optional interface used to provide a dedicated communication route between two devices, and is implemented by USB, a dedicated bus, or the like. Also, the local interface may be implemented by tunneling packets via frames applied to the local interface.

Furthermore, program codes and related data according to the present invention are stored in a floppy™ disk (FD) or CD-ROM, and are supplied to a computer from there. The objects of the present invention are achieved by supplying a storage medium, which records a program code of a software program that can implement the functions of the above-mentioned embodiments to a computer or image processing apparatus, and reading out and executing the program code stored in the storage medium by a computer (or a CPU or MPU) of the computer or image processing apparatus.

As a method of supplying programs and data to a computer, it is a common practice to adopt a method of storing the programs and data in a floppy™ disk and supplying them to a computer main body (via a floppy™ disk drive). In this case, the program code itself read out from the storage medium implements the functions of the above-mentioned embodiments, and the storage medium which stores the program code constitutes the present invention.

As the storage medium used to supply the program code, an optical disk, magneto-optical disk, CD, DVD, magnetic tape, nonvolatile memory card, ROM, and the like may be used in addition to the floppy™ disk, hard disk, and the like. The CD includes a CD-ROM and CD-R, and the DVD includes a DVD-ROM, DVD±R/RW, and DVD-RAM.

The functions of the aforementioned embodiments are implemented not only by executing the program code read out by the computer or image processing apparatus. The present invention also includes a case wherein the functions of the aforementioned embodiments are implemented by some or all actual processing operations which are executed by an OS (operating system) running on the computer or image processing apparatus based on instructions of the program code.

Furthermore, the present invention includes a case wherein the program code read out from a storage medium is written in a memory of an expansion card or a function expansion unit which is inserted into or connected to the computer. After that, the functions of the aforementioned embodiments are implemented by some or all of actual processes executed by a CPU or the like arranged in the function expansion card or unit based on the instruction of that program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-083868, filed Mar. 24, 2006, which is hereby incorporated by reference herein in its entirety.

What is claimed is:

1. An information processing apparatus which can communicate with an image processing apparatus, said information processing apparatus comprising:
   a first network interface that connects the image processing apparatus via a first network;
   a second network interface that connects an other information processing apparatus via a second network;
   a first setting unit that sets a first network address, which is a network address of the image processing apparatus, as a network address of said second network interface;
   a second setting unit that sets a second network address different from the first network address as a network address of said first network interface;
   a first determining unit that determines a third network address different from the first network address and the second network address as a network address of the other information processing apparatus based on the first network address and the second network address;
   a transmitting unit that transmits the third network address determined by said first determining unit to the other information processing apparatus; and
   a communication controller unit,
   wherein the information processing apparatus communicates with the other information processing apparatus via the second network using the communication controller unit and the first network address, and communicates with the image processing apparatus via the first network using the communication controller unit and the second network address.

2. The apparatus according to claim 1, further comprising a receiving unit that receives an ARP request packet transmitted from the image processing apparatus,
   wherein a source network address of the ARP request packet is the first network address, which is set by the first setting unit as the network address of said second network interface.

3. The apparatus according to claim 1, wherein said transmitting unit transmits the third network address determined by said first determining unit to the other information processing apparatus in response to a request from the other information processing apparatus.

4. The apparatus according to claim 1, further comprising:
   a query unit that sends a query about the second network address to be set in said first network interface to the image processing apparatus; and
   a second determining unit that determines, when a response to the query sent from said query unit is not received, the second network address different from the first network address set by said first setting unit,
   wherein said second setting unit sets the second network address determined by said second determining unit for said first network interface.

5. The apparatus according to claim 1, further comprising a storage unit that stores a plurality of network address candidates to be transmitted to the other information processing apparatus,
   wherein said first determining unit determines the third network address different from the first network address and the second network address as the network address of the other information processing apparatus from the plurality of network address candidates stored in said storage unit.

6. The apparatus according to claim 1, wherein said image processing apparatus is a printer, and said information processing apparatus is an apparatus that provides one of a secure print function and an e-mail print function.

7. An information processing apparatus which can communicate with an image processing apparatus, said information processing apparatus comprising:
   a first network interface that connects an other information processing apparatus via a second network, the other information processing apparatus being connected to the image processing apparatus via a first network different than the second network;
   a second network interface that connects to a third network different from the first network and the second network;
   a first setting unit that sets a first network address, which is a network address of the image processing apparatus, as a network address of said second network interface;

a receiving unit that receives a second network address different from a third network address set in the other information processing apparatus from the other information processing apparatus;

a second setting unit that sets the second network address received by said receiving unit as a network address of said first network interface; and a communication controller unit, wherein the information processing apparatus communicates via the third network using the communication controller unit and the first network address, and communicates with the other information processing apparatus via the second network using the communication controller unit and the second network address.

8. The apparatus according to claim 7, wherein said image processing apparatus is a printer, and said information processing apparatus is an apparatus that provides one of a secure print function and an e-mail print function.

9. An information processing apparatus which can communicate with an image processing apparatus, said information processing apparatus comprising:

a first network interface that connects an other information processing apparatus via a second network, the other information processing apparatus being connected to the image processing apparatus via a first network different than the second network;

a second network interface that connects to a third network different from the first network and the second network;

a first setting unit that sets a first network address, which is a network address of the image processing apparatus, as a network address of said second network interface;

a receiving unit that receives a third network address set in the other information processing apparatus from the other information processing apparatus;

a second setting unit that sets a second network address different from the third network address received by said receiving unit as a network address of said first network interface; and a communication controller unit, wherein the information processing apparatus communicates via the third network using the communication controller unit and the first network address, and communicates with the other information processing apparatus via the second network using the communication controller unit and the second network address.

10. The apparatus according to claim 9, wherein said image processing apparatus is a printer, and said information processing apparatus is an apparatus that provides one of a secure print function and an e-mail print function.

11. A method of controlling an information processing apparatus which can communicate with an image processing apparatus, said method comprising:

a first setting step of setting a first network address, which is a network address of the image processing apparatus, as a network address of a second network interface that connects an other information processing apparatus via a second network;

a second setting step of setting a second network address different from the first network address as a network address of a first network interface that connects the image processing apparatus via a first network;

a first determining step of determining a third network address different from the first network address and the second network address as a network address of the other information processing apparatus based on the first network address and the second network address; and a transmitting step of transmitting the third network address determined in the first determining step to the other information processing apparatus, wherein the information processing apparatus communicates with the other information processing apparatus via the second network using a communication controller unit and the first network address, and communicates with the image processing apparatus via the first network using the communication controller unit and the second network address.

12. The method according to claim 11, further comprising a receiving step of receiving an ARP request packet transmitted from the image processing apparatus, wherein a source network address of the ARP request packet is the first network address, which is set in the first setting step as the network address of the second network interface.

13. The method according to claim 11, wherein in the transmitting step, the third network address determined in the first determining step is transmitted to the other information processing apparatus in response to a request from the other information processing apparatus.

14. The method according to claim 11, further comprising:

a query step of sending a query about the second network address to be set in the first network interface to the image processing apparatus; and a second determining step of determining, when a response to the query is not received, the second network address different from the first network address set in the first setting step, wherein in the second setting step, the second network address determined in the second determining step is set as the network address of the first network interface.

15. The method according to claim 11, wherein in the first determining step, the third network address different from the first network address and the second network address is determined as a network address of the other information processing apparatus from a plurality of network address candidates stored in a storage unit adapted to store the plurality of network address candidates to be transmitted to the other information processing apparatus.

16. A method of controlling an information processing apparatus which can communicate with an image processing apparatus, said method comprising:

a first setting step of setting a first network address, which is a network address of the image processing apparatus, as a network address of a second network interface that connects to a third network different from a first network and a second network;

a receiving step of receiving a second network address different from a third network address set in an other information processing apparatus from the other information processing apparatus; and a second setting step of setting the second network address received in the receiving step as a network address of a first network interface that connects the other information processing apparatus via the second network, which is different from the first network, the other information processing apparatus connected to the image processing apparatus via the first network, wherein the information processing apparatus communicates via the third network using a communication controller unit and the first network address, and communicates with the other information processing apparatus via the second network using the communication controller unit and the second network address.

17. A method of controlling an information processing apparatus which can communicate with an image processing apparatus, said method comprising:
- a first setting step of setting a first network address, which is a network address of the image processing apparatus, as a network address of a second network interface that connects to a third network different from a first network and a second network;
- a receiving step of receiving a third network address set in an other information processing apparatus from the other information processing apparatus; and
- a second setting step of setting a second network address different from the third network address received in the receiving step as a network address of a first network interface that connects the other information processing apparatus via the second network, which is different from the first network, the other information processing apparatus connected to the image processing apparatus via the first network,
- wherein the information processing apparatus communicates via the third network using a communication controller unit and the first network address, and communicates with the other information processing apparatus via the second network using the communication controller unit and the second network address.

18. A non-transitory computer-readable storage medium storing instructions executed by a computer system processor, said instructions comprising instructions for:
- a first setting step of setting a first network address, which is a network address of the image processing apparatus, as a network address of a second network interface that connects an other information processing apparatus via a second network;
- a second setting step of setting a second network address different from the first network address as a network address of a first network interface that connects the image processing apparatus via a first network;
- a first determining step of determining a third network address different from the first network address and the second network address as a network address of the other information processing apparatus based on the first network address and the second network address; and
- a transmitting step of transmitting the third network address determined in the first determining step to the other information processing apparatus,
- wherein said instructions further comprise instructions for causing the information processing apparatus to communicate with the other information processing apparatus via the second network using a communication controller unit and the first network address, and to communicate with the image processing apparatus via the first network using the communication controller unit and the second network address.

19. A non-transitory computer-readable storage medium storing instructions executed by a computer system processor, said instructions comprising instructions for:
- a first setting step of setting a first network address, which is a network address of the image processing apparatus, as a network address of a second network interface that connects to a third network different from a first network and a second network;
- a receiving step of receiving a second network address different from a third network address set in an other information processing apparatus from the other information processing apparatus; and
- a second setting step of setting the second network address received in the receiving step as a network address of a first network interface that connects the other information processing apparatus via the second network, which is different from the first network, the other information processing apparatus connected to the image processing apparatus via the first network,
- wherein said instructions further comprise instructions for causing the information processing apparatus to communicate via the third network using a communication controller unit and the first network address, and to communicate with the other information processing apparatus via the second network using the communication controller unit and the second network address.

20. A non-transitory computer-readable storage medium storing instructions executed by a computer system processor, said instructions comprising instructions for:
- a first setting step of setting a first network address, which is a network address of the image processing apparatus, as a network address of a second network interface that connects to a third network different from a first network and a second network;
- a receiving step of receiving a third network address set in an other information processing apparatus from the other information processing apparatus; and
- a second setting step of setting a second network address different from the third network address received in the receiving step as a network address of a first network interface that connects the other information processing apparatus via the second network, which is different from the first network, the other information processing apparatus connected to the image processing apparatus via the first network,
- wherein said instructions further comprise instructions for causing the information processing apparatus to communicate via the third network using a communication controller unit and the first network address, and to communicate with the other information processing apparatus via the second network using the communication controller unit and the second network address.

* * * * *